(12) United States Patent
Xiao et al.

(10) Patent No.: US 8,954,425 B2
(45) Date of Patent: Feb. 10, 2015

(54) SNIPPET EXTRACTION AND RANKING

(75) Inventors: Rong Xiao, Beijing (CN); Qiang Hao, Tianjin (CN); Changhu Wang, Beijing (CN); Rui Cai, Beijing (CN); Lei Zhang, Beijing (CN)

(73) Assignee: Microsoft Corporation, Redmond, WA (US)

(*) Notice: Subject to any disclaimer, the term of this patent is extended or adjusted under 35 U.S.C. 154(b) by 259 days.

(21) Appl. No.: 12/796,345

(22) Filed: Jun. 8, 2010

(65) Prior Publication Data

US 2011/0302162 A1    Dec. 8, 2011

(51) Int. Cl.
G06F 17/30    (2006.01)

(52) U.S. Cl.
CPC .... G06F 17/30867 (2013.01); G06F 17/30241 (2013.01)
USPC ........... 707/724; 707/725; 707/727; 707/729; 707/731; 707/732

(58) Field of Classification Search
CPC .................................. G06F 17/30; G06F 17/00
See application file for complete search history.

(56) References Cited

U.S. PATENT DOCUMENTS

| | | | |
|---|---|---|---|
| 5,721,827 A | | 2/1998 | Logan et al. |
| 5,732,216 A | | 3/1998 | Logan et al. |
| 5,732,260 A | * | 3/1998 | Nomiyama ............................ 1/1 |
| 5,832,100 A | * | 11/1998 | Lawton et al. ................. 382/100 |
| 5,924,108 A | * | 7/1999 | Fein et al. ...................... 715/267 |
| 6,112,203 A | * | 8/2000 | Bharat et al. ........................... 1/1 |
| 6,199,076 B1 | | 3/2001 | Logan et al. |
| 6,292,830 B1 | * | 9/2001 | Taylor et al. ................... 709/224 |
| 6,374,241 B1 | * | 4/2002 | Lamburt et al. ....................... 1/1 |
| 6,393,415 B1 | * | 5/2002 | Getchius et al. ....................... 1/1 |
| 6,397,228 B1 | * | 5/2002 | Lamburt et al. ............... 707/692 |
| 6,408,294 B1 | * | 6/2002 | Getchius et al. ....................... 1/1 |
| 6,421,683 B1 | * | 7/2002 | Lamburt ............................... 1/1 |
| 6,484,161 B1 | * | 11/2002 | Chipalkatti et al. ................... 1/1 |
| 7,281,005 B2 | * | 10/2007 | Canright et al. ....................... 1/1 |
| 7,509,178 B2 | | 3/2009 | Logan et al. |
| 7,580,931 B2 | * | 8/2009 | Liu et al. ............................... 1/1 |
| 7,617,176 B2 | * | 11/2009 | Zeng et al. ............................ 1/1 |
| 7,890,502 B2 | * | 2/2011 | Liu et al. ........................ 707/726 |

(Continued)

OTHER PUBLICATIONS

Hao, Qiang, et al., "Equip Tourists with Knowledge Mined from Travelogues," ACM Proceedings of the 19th International Conference on World Wide Web, Apr. 26-30, 2010, pp. 401-410.*

(Continued)

*Primary Examiner* — Farhan Syed
(74) *Attorney, Agent, or Firm* — Dan Choi; Judy Yee; Micky Minhas

(57) ABSTRACT

Described herein is a technology that facilitates efficient automated mining of topic-related aspects of user-generated content based on automated analysis of the user-generated content. Locations are automatically learned based on dividing documents into document segments, and decomposing the segments into local topics and global topics. Techniques are described that facilitate automatically extracting snippets. These techniques include, for example, computer annotating travelogues with learned tags and images, performing topic learning to obtain an interest model, performing location matching based on the interest model, calculating geographic and semantic relevance scores, ranking snippets based on the geographic and semantic relevance scores, and searching snippets with a "location+context term" query.

20 Claims, 13 Drawing Sheets

(56) References Cited

U.S. PATENT DOCUMENTS

| | | | |
|---|---|---|---|
| 8,112,504 B2 | 2/2012 | Logan et al. | |
| 2005/0086260 A1* | 4/2005 | Canright et al. | 707/104.1 |
| 2006/0026152 A1* | 2/2006 | Zeng et al. | 707/5 |
| 2006/0085741 A1* | 4/2006 | Weiner et al. | 715/517 |
| 2007/0112815 A1* | 5/2007 | Liu et al. | 707/101 |
| 2007/0198506 A1* | 8/2007 | Attaran Rezaei et al. | 707/5 |
| 2007/0214116 A1* | 9/2007 | Liu et al. | 707/3 |
| 2008/0319974 A1* | 12/2008 | Ma et al. | 707/5 |
| 2009/0049038 A1 | 2/2009 | Gross | |
| 2009/0119261 A1* | 5/2009 | Ismalon | 707/3 |
| 2009/0282032 A1* | 11/2009 | Liu et al. | 707/5 |
| 2009/0292685 A1* | 11/2009 | Liu et al. | 707/5 |
| 2009/0319342 A1* | 12/2009 | Shilman et al. | 705/10 |
| 2009/0327286 A1 | 12/2009 | Ge et al. | |
| 2010/0082613 A1* | 4/2010 | Liu et al. | 707/726 |
| 2010/0153318 A1* | 6/2010 | Branavan et al. | 706/12 |
| 2011/0035403 A1* | 2/2011 | Ismalon | 707/769 |
| 2011/0137906 A1* | 6/2011 | Cai et al. | 707/740 |
| 2011/0252030 A1* | 10/2011 | Spangler | 707/729 |
| 2011/0302162 A1* | 12/2011 | Xiao et al. | 707/724 |

OTHER PUBLICATIONS

Hao, Qiang, et al., "Generating Location Overviews with Images and Tags by Mining User-Generated Travelogues," Oct. 2009, Proceedings of the 17th AMC International Conference on Multimedia, pp. 801-804 (4 total pages).*

Hao, Qiang, et al., "TravelScope: Standing on the Shoulders of Dedicated Travelers,"Oct. 2009, Proceedings of the 17th AMC International Conference on Multimedia, pp. 1021-1022 (2 total pages).*

Lu, Xin, et al., "Visualizing Textual Travelogue with Location-Relevant Images," 2009, Proceedings of the 2009 international Workshop on Location Based Social Networks, pp. 65-68 (4 total pages).*

Hao, Cai, Yang, Xiao, Liu, Wang, Zhang, "TravelScope: Standing on the Shoulders of Dedicated Travelers", retrieved on Apr. 15, 2010 at <<http://research.microsoft.com/en-us/people/jmyang/mm_2009_travelscope.pdf>>, ACM, Conference on Multimedia (MM), Oct. 19, 2009, pp. 1021-1022.

Kennedy, Naaman, Ahern, Nair, Rattenbury, "How Flickr Helps us Make Sense of the World: Context and Content in Community-Contributed Media Collections", retrieved on Apr. 15, 2010 at <<http://infolab.stanford.edu/~mor/research/kennedyMM07.pdf>>, ACM, Conference on Multimedia (MM), Sep. 23, 2007, pp. 631-640.

M. Bressan, G. Csurka, Y. Hoppenot, and J. M. Renders. Travel Blog Assistant System (TBAS) an example scenario of how to enrich text with images and images with text using online multimedia repositories. Metadata Mining for Image Understanding Workshop, 2008. http://eprints.pascal-network.org/archive/00003535/01/Visapp_MMIU_TBAS.pdf.

Nanba, Taguma, Ozaki, Kobayashi, Ishino, Takezawa, "Automatic Compilation of Travel Information from Automatically Identified Travel Blogs", retrieved on Apr. 15, 2010 at <<http://nlp.csie.ncnu.edu.tw/~shin/acl-ijcnlp2009/proceedings/CDROM/Short/pdf/Short052.pdf>>, Association for Computational Linguistics, Proceedings of ACL-IJCNLP Conference Short Papers, Aug. 2009, pp. 205-208.

Popescu, Grefenstette, Moellic, "Mining Tourist Information from User-Supplied Collections", retrieved on Apr. 15, 2010 at <<http://comupedia.org/adrian/articles/sp0668-popescu.pdf>>, ACM, Proceeding of Conference on Information and Knowledge Management (CIKM), Nov. 2, 2009, pp. 1713-1716.

Titov, McDonald, "A Joint Model of Text and Aspect Ratings for Sentiment Summarization", retrieved on Apr. 15, 2010 at <<http://www.aclweb.org/anthology/P/P08/P08-1036.pdf>>, Proceedings of Meeting by Association for Computational Linguistics (ACL), Jun. 2008, pp. 308-316.

Zhuang, Jing, Zhu, "Movie Review Mining and Summarization", retrieved on Apr. 15, 2010 at <<http://research.microsoft.com/en-us/um/people/leizhang/Paper/cikm06_movie.pdf>>, ACM, Proceedings of Conference on Information and Knowledge Management, 2006, pp. 43-50.

Asadi, Zhou, Jamali, Mofrad, "Location-Based Search Engines Tasks and Capabilities: A Comparative Study", retrieved on Apr. 15, 2010 at <<http://www.webology.ir/2007/v4n4/a48.html>>, Webology, vol. 4, No. 4, Article 48, 2007, pp. 1-15.

Blei, Ng, Jordan, "Latent Dirichlet Allocation", retrieved on Apr. 15, 2010 at <<http://www.cs.cmu.edu/~jch1/research/presentation/LDAUnrolled.ppt>>, Huang Presentation of Journal of Machine Learning Research, vol. 3, Jan. 2003, pp. 993-1022.

C. Chemudugunta, P. Smyth, and M. Steyvers. Modeling general and specific aspects of documents with a probabilistic topic model. NIPS, 2006. http://books.nips.cc/papers/files/nips19/NIPS2006_0305.pdf.

C. Wang, J. Wang, X. Xie, W.Y. Ma. Mining geographic knowledge using location aware topic model. GIR, 2007.

D. Crandall, L. Backstrom, D. Huttenlocher, and J. Kleinberg. Mapping the Worlds Photos. WWW, 2009. http://www.www2009.org/proceedings/pdf/p761.pdf.

D. M. Blei, A. Y. Ng, and M. I. Jordan. Latent dirichlet allocation. JMLR, 3:993-1022, 2003. http://www.cs.utah.edu/~hal/courses/2008S_ML/BleiNgJordan2003.pdf.

D. Newman, C. Chemudugunta, P. Smyth, and M. Steyvers. Statistical entity-topic models. KDD, 2006. http://psiexp.ss.uci.edu/research/papers/Newman_SIGKDD06.pdf.

E. Moxley, J. Kleban, and B. S. Manjunath. SpiritTagger: a geo-aware tag suggestion tool mined from Flickr. MIR 2008. http://vision.ece.ucsb.edu/publications/moxley_MIR_2008.pdf.

F. Jing, L. Zhang, and W.Y. Ma. VirtualTour: an online travel assistant based on high quality images. MM, 2006. http://research.microsoft.com/users/leizhang/Paper/ACMMM06-VT.pdf.

Flickr. http://www.flickr.com/.

Gale, Kirillov, Mangold, "The Yahoo! Geo Technologies Blog", retrieved on Apr. 16, 2010 at <<http://www.ygeoblog.com/2009/02/location-aware-voice-enabled-search-on-the-hoof/>>, Yahoo! Inc., 2009, pp. 1.

Griffiths, Steyvers, "Finding Scientific Topics", retrievd on Apr. 15, 2010 at <<http://faculty.cs.byu.edu/~ringger/CS601R/papers/GriffithsSteyvers-PNAS-0307752101v1.pdf>>, Proceedings of Colloquium of National Academy of Sciences (PNAS), Mapping Knowledge Domains at Arnold and Mabel Beckman Center of the National Academies of Sciences and Engineering, May 9, 2003, pp. 1-8.

Hao, et al., Equip Tourists with Knowledge Mined from Travelogues, WWW2010, Apr. 24-30, 2010, Raleigh, North Carolina, 10 pages.

I. Simon, N. Snavely, and S. M. Seitz. Scene summarization for online image collections. ICCV, 2007. http://www.cs.washington.edu/homes/iansimon/papers/canonview.pdf.

I. Titov and R. McDonald. Modeling online reviews with multi-grain topic models. WWW, 2008. http://www2008.org/papers/pdf/p111-titov.pdf.

J. Chang, J. Boyd Graber, and D. M. Blei. Connections between the lines: augmenting social networks with text. KDD, 2009. http://www.cs.princeton.edu/~jbg/documents/kdd2009.pdf.

J. Kim, H. Kim, and J. Ryu. TripTip: a trip planning service with tag-based recommendation. CHI, 2009.

K. Jarvelin and J. Kekalainen. IR evaluation methods for retrieving highly relevant documents. SIGIR, 2000. http://www.info.uta.fi/tutkimus/fire/archive/KJJKSIGIR00.pdf.

L. Kennedy and M. Naaman. Generating diverse and representative image search results for landmarks. WWW, 2008. http://infolab.stanford.edu/~mor/research/kennedy-www08.pdf.

M. Rosen Zvi, T. Griffiths, M. Steyvers, and P. Smyth. The author-topic model for authors and documents. UAI, 2004. http://psiexp.ss.uci.edu/research/papers/uai04_v8.pdf.

Martins, Silva, Andrade, "Indexing and Ranking in Geo-IR Systems", retrieved on Apr. 15, 2010 at<<http://citeseerx.ist.psu.edu/viewdoc/download?doi=10.1.1.96.1329&rep=rep1&type=pdf>>, ACM, Proceedings of Workshop on Geographic Information Retrieval (GIR), 2005, pp. 31-34.

"MetaCarta GSRP Core Function—GeoTag", retrieved on Apr. 15, 2010 at <<MetaCarta GSRP Core Function—GeoTag>>, MetaCarta, Inc., 2010, pp. 1.

(56) References Cited

OTHER PUBLICATIONS

Q. Hao, R. Cai, X.J. Wang, J.M. Yang, Y. Pang, and L. Zhang. Generating location overviews with images and tags by mining user-generated travelogues. MM, 2009.

Q. Mei, C. Liu, H. Su, and C. Zhai. A probabilistic approach to spatiotemporal theme pattern mining on weblogs. WWW, 2006. http://www2006.org/programme/files/pdf/544.pdf.

Q. Mei, C. Zhai. A mixture model for contextual text mining. KDD, 2006. http://net.pku.edu.cn/~course/cs410/reading/kdd06-mix.pdf.

Q. Mei, D. Cai, D. Zhang, and C. Zhai. Topic modeling with network regularization. WWW 2008. http://wwwconference.org/www2008/papers/pdf/p101-meiA.pdf.

S. Ahern, M. Naaman, R. Nair, and J. Yang. World Explorer: visualizing aggregate data from unstructured text in geo-referenced collections. JCDL, 2007. http://infolab.stanford.edu/~mor/research/JCDL07-ahern-WorldExplorer.pdf.

T. Griffiths and M. Steyvers. Finding scientific topics. PNAS,101:5228 to 5235, 2004. http://www.pnas.org/cgi/content/full/101/suppl_1/5228.

Tsai, "GeoSearch: Enabling Location-Aware Search on the Geographic Web", retrieved on Apr. 16, 2010 at <<http://www3.ntu.edu.sg/home/efstsai/GeoSearch/>>, Nanyang Technological University School of EEE, Singapore, 2010, pp. 1-5.

X. Wu, J. Li, Y. Zhang, S. Tang, and S.Y. Neo. Personalized multimedia web summarizer for tourist. WWW, 2008. http://www2008.org/papers/pdf/p1025-wu.pdf.

Y.T. Zheng, M. Zhao, Y. Song, H. Adam, U. Buddemeier, A. Bissacco, F. Brucher, T.S. Chua, and H. Neven. Tour the world: building a web-scale landmark recognition engine. CVPR, 2009. http://www.google.com/googleblogs/pdfs/google_landmark_recognition.pdf.

Office action for U.S. Appl. No. 12/796,303, mailed on Sep. 17, 2012, Cai et al., "Mining Topic-Related Aspects From User Generated Content," 7 pages.

* cited by examiner

SNIPPET EXTRACTION AND RANKING

BACKGROUND

As various Web 2.0 technologies have prospered blogs, wikis, and social networking technologies have become increasingly popular with consumers who increasingly share information about their experiences, frequently including information about travel experiences. While consumers increasingly may read such information on the Web, they are not always able to make use of it for their own travel planning because user blog entries are prolific and the information is unstructured, inconsistent, and influenced by the authors' personal biases, which are not always apparent to a reader. Thus, when looking for travel information, consumers often turn to travel planning sites, rather than user blogs. However many travel planning sites rely on editorial content, which may reflect the editors' biases and may be influenced by advertisers and partnerships, which may not be readily apparent to the consumer.

SUMMARY

A technology that facilitates automated mining of topic-related aspects from user-generated content to provide recommendations and content summaries based on automated analysis using a particular probabilistic topic model for snippet extraction and ranking (SER) is described herein. An example described is mining location-related aspects for recommending destinations, summarizing destinations, and enriching travelogues with images based on automated analysis of travelogues using a Location-Topic (LT) model for geo-snippet extraction and ranking (GSER). By mining location-related aspects from travelogues via GSER, useful information is synthesized to provide rich information for travel planning. As described herein, these techniques include automatically extracting information associated with attractions (e.g., Hawaii), and context words such as style or keywords (e.g., beach). Such extraction enables automatic destination summarization and recommendation as well as automatic travelogue enrichment. These techniques also include calculating geographic relevance scores for candidate snippets, calculating semantic relevance scores for candidate snippets, and ranking candidate snippets based on the geographic and semantic relevance scores.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit of a reference number identifies the figure in which the reference number first appears. The use of the same reference numbers in different figures indicates similar or identical items. A reference number with a parenthetical suffix (e.g., "104(1)" or "112(a)") identifies a species of the feature represented by the general reference number (e.g., "104" or "112"). Use of the general reference number without a parenthetical suffix (e.g., "104" or "112") identifies the genus or any one or more of the species.

DETAILED DESCRIPTION

Overview

Figure 1:
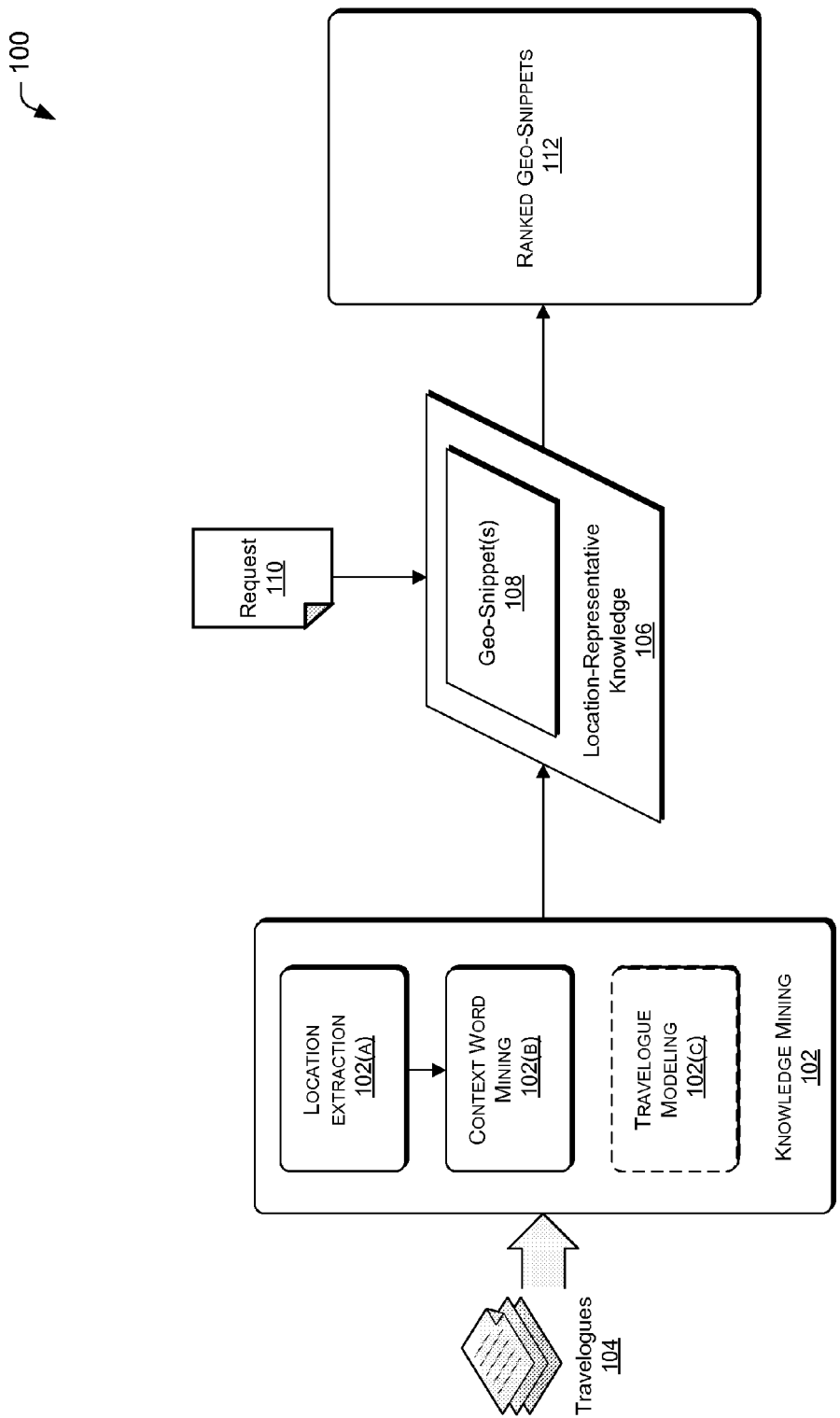
FIG. 1 is a block diagram of an example of a framework for performing snippet extraction and ranking (SER).

This disclosure is directed to a framework and techniques for automated mining of topic-related aspects from user-generated content, e.g., automated mining of location-related aspects from travelogues. The described operations facilitate automatic synthesizing of recommendations from the user-generated content, summarizing the user-generated content, and enriching the user-generated content based on automated analysis of the user-generated content using a particular probabilistic topic model for snippet extraction and ranking (SER). For example, the described operations facilitate automatic synthesizing of destination recommendations, summarizing of destinations and enriching of travelogues based on automated analysis of travelogues using a Location-Topic (LT) model for geo-snippet extraction and ranking (GSER). By mining location-related aspects from travelogues via the LT model and GSER, useful information is synthesized to provide rich information for travel planning.

The described LT model facilitates automatic snippet extraction from user-generated content, such as travelogues, and ranking based on geo-snippet extraction (GSER). The tools and techniques described herein enable building a data source of geo-snippets from user-generated content by identifying locations mentioned in travelogues, segmenting a travelogue into a number of snippets, and assembling snippets that mention at least one location and that meet a length constraint to form a snippet collection. In other instances, a data source of snippets from user-generated content may be built by identifying topics mentioned in the user-generated content, segmenting the user-generated content into a number of snippets, and assembling snippets that mention at least one topic and that meet a length constraint to form a snippet collection Acquiring knowledge from travelogues to meet the information needs of tourists planning travel is challenging, due in part to intrinsic limitations of the raw travelogue data, including noisy topics, multiple viewpoints, lack of destination recommendations, and lack of destination comparisons.

Noisy topics arise from the unstructured style of user-generated content. Travelogues and other such user-generated content typically contain a lot of noise. For example, the depictions of destinations and attractions, in which tourists planning travel are most interested, are usually intertwined with topics, such as lodging and transportation, common in various travelogues for different locations.

Multiple viewpoints come from many previous travelers' excursions to various destinations. When planning travel to a destination, one is faced with a dilemma because the viewpoint of a single travelogue may be biased, while reading a number of travelogues about the same or similar destinations may be too time consuming. Additionally, few tourists want to spend the time to create an overview summarizing travelogues related to the same or similar destinations. While some overviews may be found on the Internet, their content is typically editorial. In other words, the content is controlled by an editor, like a paid travel planner, travel agent, or marketer, and may be biased or may not accurately reflect the opinions of many previous travelers about a destination.

User-created travelogues do not typically provide destination recommendations based on local characteristics. A collection of travelogues may cover many popular travel destinations, but the depictions in a single travelogue usually only include, at most, a few destinations. Hence, for tourists who are seeking travel with a particular characteristic, (e.g., going to a beach, going to the mountains, going hiking, etc.), there is not a straightforward and effective way to obtain unbiased recommendations from the traveler's point of view.

In user-created travelogues, besides occasional explicit comparisons made by authors, little information is typically provided about similarity between destinations. However, such comparison information is often helpful for those planning travel who may be seeking suggestions about destinations similar (or dissimilar) to particular destinations with which they are familiar.

In view of the above challenges, several kinds of information processing techniques are leveraged to mine location-related aspects from travelogues to bridge the gap between raw travelogues and the information needs of tourists planning travel. Regarding the issue of noisy topics, techniques for mining location-related aspects from travelogues discover topics in travelogues and further distinguish location-related topics from other noisy topics.

Regarding the issue of multiple viewpoints, techniques for mining location-related aspects from travelogues generate a representation of locations that summarizes useful descriptions of a particular location to capture representative knowledge of the location. Such representative knowledge of the location includes, for example, characteristics from the perspective of tourism, (e.g., attractions, activities, styles).

Regarding destination recommendations, techniques for mining location-related aspects from travelogues including geo-snippet extraction (GSE) apply a relevance metric to suggest locations most relevant to tourists' travel intentions.

Regarding destination comparisons, techniques for mining location-related aspects from travelogues employ a location similarity metric to compare locations from the perspective of travel. Tools for mining location-related aspects from travelogues address noisy topics and multiple viewpoints because the location-representative knowledge mined from many location-related topics provide the input for the ranking and similarity metrics for locations based on geo-snippet extraction (GSE).

In some situations, travelogues have associated tags. Such tags may be entered by users or generated, for example, using the techniques described herein. Tags can help identify the subject matter of travelogues. However, travelogue entries may reference multiple locations that may not be captured in the tags. For example, an entry describing a road trip along the California coast between Los Angeles and San Francisco may contain information of interest for those planning travel to California generally, as well as travel to Los Angeles and/or San Francisco. However, the author may simply tag the entry "road trip." Additionally, users sometimes tag travelogue entries with names or captions, like "Travis," "honeymoon," or "spring break." Thus, even when users save or submit tags with their travelogues, the user-submitted tags may not be particularly relevant to understanding locations associated with the travelogue. Nor will the user-submitted tags necessarily be helpful for travel planning because, for example, a companion's name is personal and not likely to be associated with a location.

Reliance on user-submitted tags can be problematic for several reasons. For example, user-submitted tags may cause a lexical gap or a semantic gap, and many travelogues do not have user-submitted tags.

A lexical gap caused by user-submitted tags may be understood from the following example. When users tag travelogue entries, they often tag travelogue entries with names. For example, a travelogue about a family reunion may be tagged with the names of the family members who attended. However, the names of the attendees are not likely to be in text associated with other travelogue entries, for example, written by other users, associated with the same location or characteristics of that location. Thus a lexical, or word gap would exist for results based on the user-submitted tags.

Similarly, a semantic gap caused by user-submitted tags, although more complex, may be understood from the following example. The term "beach" may appear in user-submitted tags, but semantically "beach" is not specific enough to indicate whether the travelogue entry discusses a tropical beach, a stormy beach, a secluded beach, etc. Some user-submitted tags will include a descriptor such as "tropical," "stormy," "secluded," etc. When such descriptors are included in user-submitted tags, they may be helpful to show relevant entries. However, because user-submitted tags are inconsistent, an entry discussing a beach without such a descriptor may be at least as relevant for travel planning as an entry discussing a beach with a descriptor. Thus a semantic or meaning gap would exist for results based on the user-submitted tags. Furthermore, as mentioned above, many travelogues do not have user-submitted tags. Thus, tag-based analysis of travelogues from user-submitted tags is not possible for those untagged travelogues.

In various implementations, geo-snippet extraction and ranking acts as an automatic tagging application to overcome the lexical and semantic gaps or dearth of user-submitted tags. In at least one embodiment, even when user-submitted tags are available, such tags are disregarded to obviate the lexical and semantic gaps that user-submitted tags introduce.

A system for mining topic-related aspects from user-generated content including snippet extraction and ranking (SER) is set forth first below. The system described below constitutes but one example and is not intended to limit application of the techniques to any one particular architecture. Other systems may be used without departing from the spirit and scope of the claimed subject matter. Additional sections describe instances of various techniques, examples of implementations, and illustrative embodiments. These sections describe ways in which travel planning may be enhanced. For example, destinations may be mined from user-generated travelogues for travel planning enrichment via enhanced results obtained using geo-snippet extraction and ranking (GSER). In various implementations parts of the knowledge mining operations presented may occur offline, online, before activation of applications that use the mined knowledge, or in real time. An example of an environment in which these and other techniques may be enabled is also set forth.

Example Framework

FIG. 1, illustrates an example of a framework for mining topic-related aspects from user-generated content, e.g., mining location-related aspects from user-generated travelogues. FIG. 1 also illustrates that knowledge learned from the location-related aspects, including geo-snippets extracted from user-generated travelogues, may be used in any of multiple applications. According to framework 100, knowledge mining operations 102 are performed to extract location-related aspects from travelogues 104.

In the example illustrated, knowledge mining operations 102 include location extraction, 102(A) and context word mining 102(B). In some implementations other knowledge mining operations such as travelogue modeling 102(c) may be included. The knowledge mining operations 102 result in location-representative knowledge 106 including extracted geo-snippets 108. When a request or query 110 is for a location coupled with a context word such as a style word or keyword, relevant results may be obtained based on the location and associated context. Location-representative knowledge 106 including extracted geo-snippets 108 supports various applications including providing ranked geo-snippets 112 responsive to a request or query 110. In another example of a supported application, representative snippets, including geo-snippets, can be extracted to describe a location's characteristics and can be linked to the source travelogues for detailed context. As a result, travelogues and photos may be automatically combined to characterize locations with both textual and visual descriptions, covering comprehensive aspects, which are informative for travel planners. In some implementations one or more of the various applications may be executed as part of knowledge mining 102.

Location extraction 102(A) is performed to extract locations mentioned in the text of a travelogue 104. Context word mining 102(B) is performed to mine accompanying context, e.g., style or keywords from the text of a travelogue 104 at 102(B). In some implementations, travelogue modeling 102(c) trains a Location-Topic (LT) model on locations extracted from travelogues 104 to learn local and global topics, as well as to obtain geo-snippets from the local topic space. A topic space is a multi-dimensional geometric space, in which each dimension represents a single semantic topic.

Location-representative knowledge 106 may include, for example, locations (e.g., Hawaii, Poipu Beach, San Francisco, etc.), local topics (e.g., sunset, beach, lava, bridge, etc.), and global topics (e.g., hotel, airport, photo, etc.).

In one example, a snippet collection containing a collection of geo-snippets 108 is built from travelogues in several steps. In at least one implementation the steps include 1) identifying and extracting locations mentioned in the travelogues, 2) segmenting a travelogue into a number of geo-snippets, and 3) assembling the snippet collection to include snippets that each mention at least one location and that each meet a configurable length constraint (i.e., a minimum and/or maximum numbers of words). In various implementations a geo-snippet is configured for a fixed granularity level of text, such as a number of words on either side of an identified location and/or context word, a sentence containing the location and/or context word, several consecutive sentences, or a paragraph containing the location and context word.

In various implementations, a geo-snippet 108 is represented by locations and words within the snippet as well as a quality score determined based on the length of the snippet.

The quality score indicates the appropriateness of the snippet such that snippets with low quality scores are unacceptably long or unacceptably short. In at least one instance acceptable length is dynamically configurable. Moreover, the thresholds for acceptable length need not be symmetrical. In other words, a threshold under which a snippet would be treated as too short may be a smaller number of units from an ideal range as compared to a threshold under which a snippet would be treated as too long, or the converse, e.g., (short: 7), (long: 10), (short: 10), (long: 9).

The geo-snippet s illustrated by 108 is represented as a triple of ($\mathcal{L}_s$, $W_s$, $q_s$), where $\mathcal{L}_s$ represents the set of locations mentioned in the geo-snippet, $W_s$ represents the set of words (excluding the locations) and $q_s$ represents the quality score of snippet s.

In an example of one scenario of geo-snippet extraction and ranking (GSER), the LT model automatically provides support, responsive to a query or request 110, for operations to automatically identify and extract geo-snippets 108, which are relevant to the query 110, from travelogues. Steps to automatically identify, extract, and rank geo-snippets 108 include: 1) receiving a location+context term query 110, 2) identifying a candidate snippet, in some cases from an existing snippet collection 3) calculating a geographic relevance score for a candidate snippet, 4) calculating a semantic relevance score for the candidate snippet, and 5) ranking candidate snippets based on a combination of the geographic relevance score and the semantic relevance score.

Ranked geo-snippets 112 are determined based on a combination of a geographic relevance score and a semantic relevance score relative to the request 110. The ranking is discussed in more detail with regard to FIG. 12, below.

Figure 2:
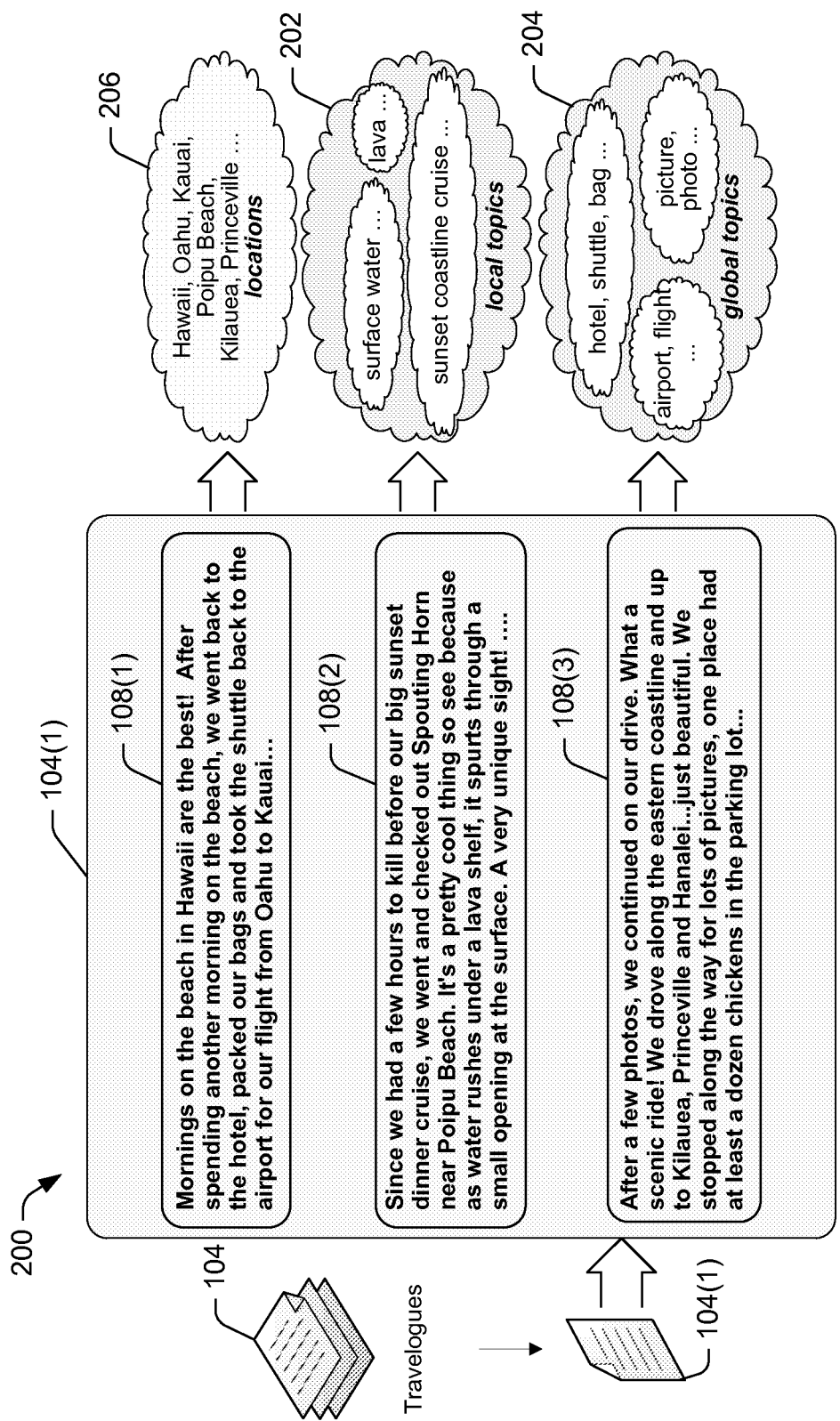
FIG. 2 is a pictorial representation of a decomposition model applied to a travelogue.

FIG. 2 illustrates decomposition, at 200, of three example geo-snippets 108 of a travelogue 104(1) from travelogues 104. Although FIG. 2 shows geo-snippets 108(1), 108(2), and 108(3) extracted from a single travelogue, in several implementations geo-snippets are extracted from many travelogues and ranked using geo-snippet extraction (GSER) techniques in order to leverage the richness of information available from multiple sources. Such GSER techniques addresses information from a single travelogue possibly being noisy or biased because numerous travelogues as a whole can reflect people's overall preference and understanding of travel resources and can serve as a reliable knowledge source.

As shown in FIG. 2, a travelogue may contain a variety of topics. In the illustrated example, local topics extracted from travelogue 104(1) are shown at 202, global topics extracted from travelogue 104(1) are shown at 204, and locations from travelogue 104(1) are shown at 206. In the illustrated example, locations are extracted. In other examples, locations at 206 may be learned based on local topics 202.

The Location-Topic (LT) model enables discovery of topics from travelogues and virtually simultaneous representation of locations with appropriate topics via geo-snippet extraction (GSE). As discussed above, discovered topics include two types of topics. Local topics 202 characterize locations from the perspective of travel (e.g., sunset, cruise, coastline, etc.). Global topics 204 do not particularly characterize locations but rather extensively co-occur with various locations in travelogues such as hotel, airport, photo, etc. Local topics may correspond to context words including style or keywords in various implementations.

Implementations of the tools for mining location-related aspects from travelogues and geo-snippet extraction (GSE) include a probabilistic topic model, termed a Location-Topic (LT) model, to discover topics from travelogues and virtually simultaneously represent locations with corresponding appropriate topics. The LT model defines two types of topics. One type of topic includes local topics, which characterize specific locations from the perspective of travel (e.g., sunset, cruise, coastline, etc.). Another type of topic includes global topics, which do not particularly characterize certain locations but rather extensively co-occur with reference to various locations in travelogues (e.g., hotel, airport, etc.).

Travelogues are decomposed into local and global topics based on the Location-Topic (LT) model that extracts location-representative knowledge including geo-snippets from local topics, while filtering out other semantics captured by global topics. Based on the LT model, a particular location may be represented as a mixture of local topics mined from a travelogue collection. This facilitates automatically summarizing multiple view-points of a location. Moreover, based on a learned location representation in a local topic space of the LT model, quantitative measurement of both the relevance of a location to a given travel idea and similarity between locations is possible.

With requests for a location, relevant results to be mined may be determined based on an intersection of the location itself using a Location-Topic (LT) model. With requests for characteristics of locations, e.g., surf, tropical, ocean, etc., relevant results to be mined may be determined based on an intersection of the characteristics and associated locations using the LT model. With requests for a location coupled with a context word such as a style word or keyword, e.g., Hawaii+ beach, Las Vegas+casino, Pacific Coast+hiking, Mountain+ skiing, etc., relevant results to be mined may be determined based on an intersection of the location and associated context using the LT model. Destinations may be recommended, in terms of either similarity to a particular destination such as Miami, Honolulu, Aspen, Whistler, etc. and/or relevance to a given travel subject such as beach, diving, mountains, skiing, hiking, etc. As used herein such a travel subject may represent a location or a context in the context of a query such as request 110 based on the remainder of the query.

Often the first question for a tourist seeking to plan travel is "where should I go?" Meanwhile, the tourist typically has some preferences regarding travel destinations, which are usually expressed in terms of two criteria, similarity and intention. The first criterion, similarity, represents a desire that the new travel destination be similar to a given location, e.g., "I enjoyed the trip to Honolulu last year. Is there another destination with similar style?" The second criterion, intention, represents a desire that the new travel destination be relevant to a given travel intention, e.g., "I plan to go hiking next month. Could you recommend some good hiking destinations?"

To obtain a similarity-oriented recommendation in accordance with the similarity criterion, given a set of candidate destinations and a query location (e.g., "Honolulu"), each destination is determined to have a similarity to the query location in the local topic space. Moreover, whatever the given query, every destination has an intrinsic popularity which is accounted for by the destination recommendation application represented by 306. The destination recommendation application, represented by 306, computes rank scores for recommendations in a way that controls the influence of the intrinsic popularity in ranking. The intrinsic popularity is approximated by how often a destination is described in travelogues. As new travelogue entries are collected from the Web, intrinsic popularity is kept updated to reflect travel trends.

To obtain a relevance-oriented recommendation in accordance with the intention criterion, given a travel intention described by a term (e.g., "hiking"), destinations are ranked in terms of relevance to the query. Travel intention contains more semantics than a single term. Thus, in various implementations, to provide a comprehensive representation to the travel ideal, the single term in the local topic space is expanded as a distribution over the local topics. In this way, the relevance of each location to the query is automatically measured, for example, using Kullback-Leibler (KL)-divergence. This query expansion strategy supports more complex travel intentions, and enables operation on multiword or natural language queries in several implementations.

In several embodiments, an overview of a destination is obtained by automatically summarizing its representative aspects. In at least one implementation, textual tags are automatically generated to summarize a destination's representative aspects. In several implementations representative snippets are also offered as further descriptions to verify and interpret the relation between a tag and the destination. In such implementations, rank scores of geo-snippets may be used in order to return appropriately relevant snippets.

Once a potential destination has been determined, a travel planner may desire more details about the destination. For example, "What are the most representative things about San Francisco?" The request may include "Can you tell me in a few words or sentences?" In some implementations, such requests may represent additional criteria to the similarity and intention criteria discussed above. In at least one implementation, to summarize representative aspects of a destination, the LT model generates representative tags and via geo-snippet extraction, identifies related snippets for each tag to describe and interpret relationships between a tag and the corresponding destination.

Representative tags may be generated using several approaches. In comparison to the LT model, term frequency (TF) and term frequency-inverse document frequency (TF-IDF), are less accurate and produce tags including noise due to terms commonly co-occurring with regard to various locations. TF generates a pseudo document for each location by concatenating all travelogue paragraphs in which the location appears, and then ranking the terms in decreasing frequency in the pseudo document. TF-IDF goes further by multiplying each term's frequency with the inverse document frequency to penalize common terms. TF and TF-IDF are mentioned as baseline methods in comparison to the LT model described herein.

TABLE 1

| Destination | Top 10 representative tags |
| --- | --- |
| Anchorage | bear, moose, alaskan, glacier, fish, cruise, salmon, wildlife, trail, mountain |
| Boston | fenway, whale, historic, sox, cape, england, red, history, revere, church |
| Chicago | michigan, institute, field, lake, museum, cta, tower, loop, windy, cub |
| Las Vegas | strip, casino, show, hotel, bellagio, gamble, fountain, venetian, mgm, slot |
| Los Angeles | hollywood, star, studio, universal, movie, boulevard, theatre, china, getty, sunset |
| Maui | island, beach, snorkel, whale, ocean, luau, volcano, dive, fish, surf |
| New York City | subway, broadway, brooklyn, zero, avenue, island, yorker, manhattan, village, greenwich |

TABLE 1-continued

| Destination | Top 10 representative tags |
| --- | --- |
| Orlando | disney, park, universal, resort, world, theme, studio, kingdom, magic, epcot |
| San Francisco | bay, cable, alcatraz, chinatown, wharf, bridge, prison, bart, fisherman, pier |
| Washington D.C. | museum, memorial, monument, national, metro, capitol, war, smithsonian, lincoln, president |

Table 1 presents representative tags generated using geo-snippet extraction logic for ten destinations in the United States. Table 1 demonstrates that generated tags include not only attractions/landmarks (e.g., disney, alcatraz) but also styles (e.g., historic, beach), activities (e.g., gamble, dive), and typical icons of destinations (e.g., cable (cars) in San Francisco).

Summaries based on tags, including generated representative tags as discussed above may be produced in several implementations. An example in the area of multi-word requests is discussed below with regard to Table 5.

For a given location in knowledge mining operations 102, the LT model ranks the terms according to probability. Those terms with higher probabilities to serve as representative tags are selected for the location. In at least one implementation, given a selected tag, the LT model generates corresponding snippets via ranking all of the sentences in the travelogues 104 according to the query. From the set of candidate locations, the sentences in the travelogues 104, and the ranked terms, the sentence is ranked in terms of geographic relevance to a location. Correspondingly, the sentence is ranked in terms of semantic relevance to a tag. Using the above techniques each term in a sentence contributes to semantic relevance according to similarity.

Informative parts of a travelogue may be automatically identified and enhanced them with related content. Such enhancement improves browsing and understanding of travelogues and enriches the consumption experience associated with travel planning. In several implementations enhancing content is selected based on ranked geo-snippets 112, as discussed above.

In addition to a recommendation or a brief summarization, travelogues written by other tourists may be of interest to a travel planner.

Given a travelogue, a reader is usually interested in which places the author visited and in seeing pictures of the places visited. For example, "Where did Jack visit while he was in New York?" The request may include, "What does the Museum of Modern Art in New York look like?" In some implementations, such requests may represent additional criteria to those discussed above. To facilitate enriched travelogue browsing, the LT model detects a highlight of a travelogue such as by extracting a geo-snippet, and provides the highlight through an interface. In some instances the LT model may enrich the highlight with images from other sources based on geo-snippets to provide more visual descriptions.

Figure 3:
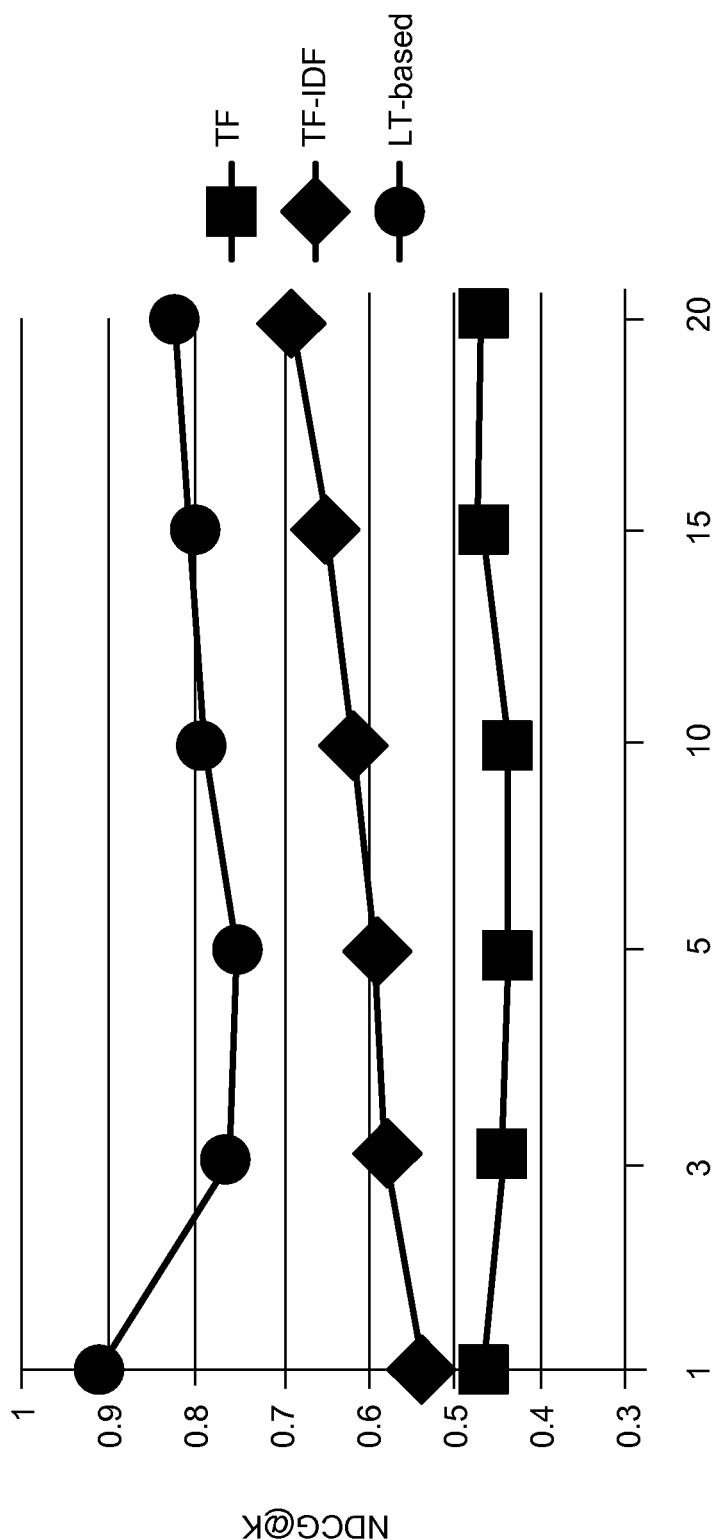
FIG. 3 illustrates a comparison of location-topic (LT) model based results obtained via geo-snippet extraction and ranking (GSER) with two baseline methods.

For example, when a travelogue refers to a set of locations, the LT model treats informative depictions of locations in the set as highlights. Each term in a document has a possibility to be assigned to a location. In this way, a generated highlight of the location may be represented with a multi-dimensional term-vector. FIG. 3 shows an evaluation of a tag ranking list generated by the baselines TF and TF-IDF compared to that of an LT model based method in one implementation. In the example illustrated at FIG. 3, each of these methods are evaluated based on the Normalized Discounted Cumulative Gain at top K (NDCG@K), which is used in information retrieval to measure the accuracy of ranking results. Because no ground-truth existed previously for location-representative tags, the results illustrated at FIG. 4 rely on a ground-truth built by graduate students selecting a top ten from a merged list of the top twenty tags generated by the LT model and each of the baseline methods. Each tag was then assigned a rating based on the number of times that tag was selected to generate a ranking list of tags as a ground-truth.

As shown at FIG. 3, the LT model outperforms the TF-IDF method and the TF method, and the TF-IDF method outperforms the TF method consistently. The TF-IDF method performs better than the TF method because the TF-IDF method penalizes the commonly co-occurring noisy tags (e.g., hotel, train), while these tags are ranked at top positions by the TF method due to their high frequencies. However, the penalty mechanism of TF-IDF is too coarse to filter out all of the noisy tags. Thus, the TF-IDF method still suggests some noisy tags. By contrast, the LT model-based approach properly characterizes such noisy tags as global topics, and thus achieves higher accuracy at the top tags.

Figure 4:
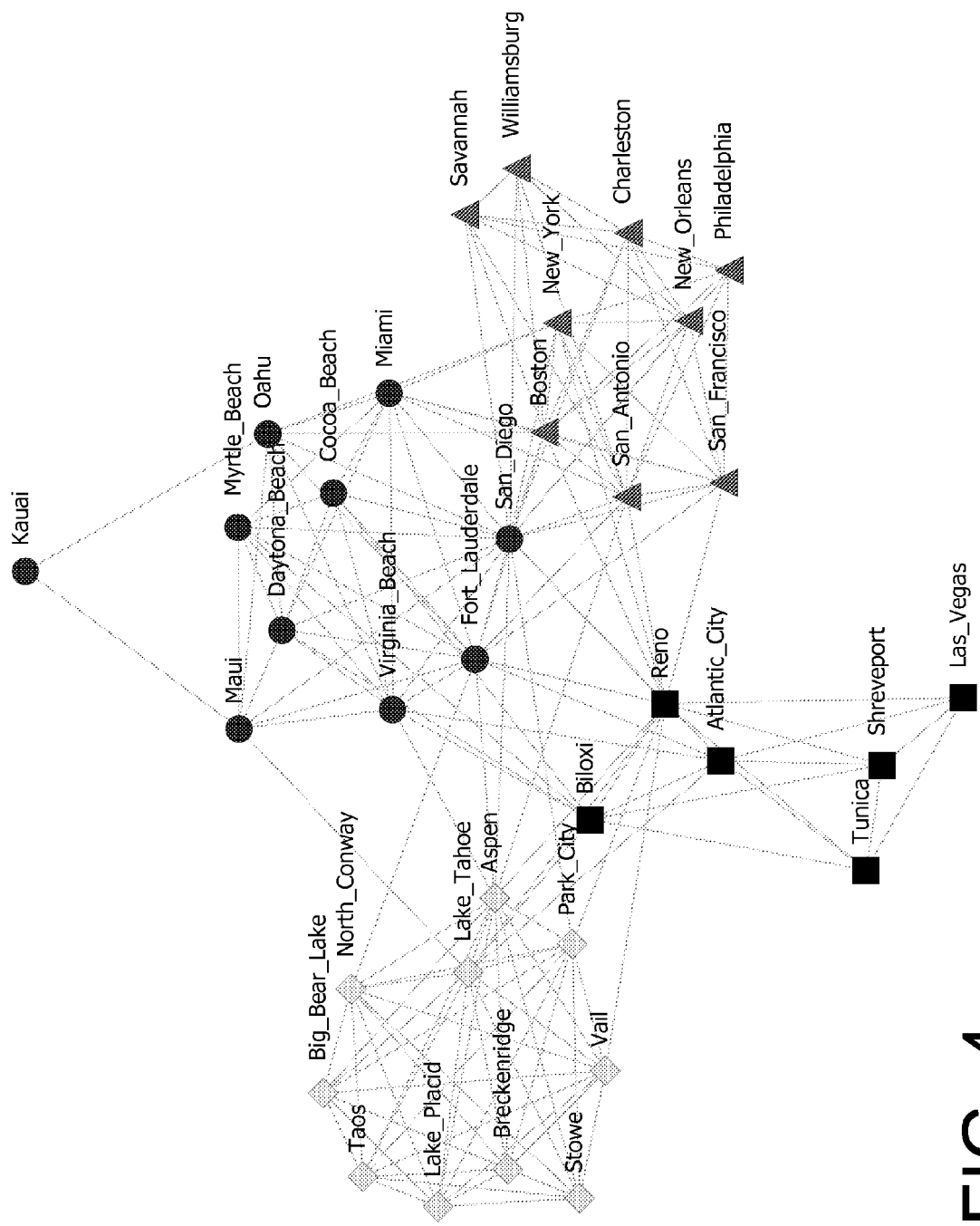
FIG. 4 is a location similarity graph generated by a local topic decomposition model.

FIG. 4 shows an example of a location similarity graph of location-related aspects mined from travelogues. The similarity graph illustrated in FIG. 4 represents a set of 36 locations built for four travel intentions. The locations were selected from a source and filtered against a test data set. The four travel intentions include (1) Beaches and Sun, (2) Casinos, (3) History and Culture, and (4) Skiing. The location set included six locations for Casinos, and 10 for each of Beaches and Sun, History and Culture, and Skiing. For each pair of locations in the set, a similarity was computed as described above. The pair-wise similarities form the location similarity graph presented in FIG. 4.

To demonstrate the graph's consistency with the ground-truth similarity/dissimilarity between the four categories of locations, a visualization service, may be used to visualize a graph. In the implementation illustrated in FIG. 4, a visualization service, such as that provided by NetDraw™ software, was used to visualize a graph where similar locations tend to be positioned close to each other. Ground-truth similarity may be confirmed from third-party sources during training of the LT model.

To illustrate topics learned by the LT model, the top 10 words (i.e., the 10 words with the highest probabilities in a topic) for several example topics from Table 1 are shown in Table 2.

For example, in Table 2, local topic #23 may be understood to represent a hiking trip to Arizona. Global topic #8, placed directly below local topic #23 could correspond to the same hiking trip. However, global topic #8, as well as the other global topics represented could correspond to any of the local topics. Similarly, local topic #62 may represent a vacation in San Diego. Global topic #22, directly below local topic #62 in Table 2, could also correspond to a vacation in San Diego. However, global topic #22 may be just as applicable to the other examples of local topics presented in Table 2, including local topic #23. However, local topics #23 and #62 do not share any characteristics as the desert and seaside locations they represent are vastly different.

TABLE 2

| Local #23 | Local #57 | Local #62 | Local #66 | Local #69 |
|---|---|---|---|---|
| desert | museum | dive | casino | mountain |
| cactus | art | snorkel | gamble | peak |
| canyon | collect | fish | play | rocky |
| valley | gallery | aquarium | slot | snow |
| hot | exhibit | sea | table | high |
| west | paint | boat | machine | feet |
| heat | work | whale | game | lake |
| spring | sculpture | reef | card | summit |
| plant | america | swim | money | climb |
| dry | artist | shark | buffet | elevate |
| Global #8 | Global #19 | Global #22 | Global #26 | Global #37 |
| flight | great | kid | room | rain |
| airport | best | family | hotel | weather |
| fly | fun | old | bed | wind |
| plane | beautiful | children | inn | cold |
| check | enjoy | fun | breakfast | temperature |
| bag | wonderful | love | bathroom | storm |
| air | love | young | night | sun |
| travel | amaze | age | door | warm |
| land | tip | son | comfort | degree |
| seat | definite | adult | book | cloud |

As Table 2 demonstrates, local topics characterize tourism styles and corresponding locations, including styles related to nature like desert (local #23), and seaside (local #62), as well as cultural styles like museum (local #57); whereas global topics correspond to common themes of travel, such as transportation (global #8), accommodation (global #26), and opinion (global #19), which tend to appear in travelogues related to almost any destination.

In the example illustrated in FIG. 4, different shapes represent different location categories. Specifically, locations corresponding to (1) Beaches and Sun are represented with circles; locations corresponding to (2) Casinos are represented with squares; locations corresponding to (3) History and Culture are represented with triangles; and locations corresponding to (4) Skiing are represented with diamonds. FIG. 4 shows how different categories of locations are visibly differentiated and clustered by the similarity metric of the LT model.

As shown by the example location similarity graph, tools and techniques for mining location-related aspects from travelogues provide a benefit from other methods including uncluttered data. For example, although a location similarity graph generated using a term frequency-inverse document frequency (TF-IDF) method may show differentiation, under the TF-IDF metric clustering is not complete. When generating a TF-IDF based location similarity graph for comparison with that of the tools for mining location-related aspects from travelogues as described with regard to FIG. 4, the TF-IDF based graph (not shown) is implemented by forming a pseudo document for each location, concatenating all the travelogues that refer to the location, and then measuring the similarity between two locations using TF-IDF cosine distance.

The approach described for comparison to such a TF-IDF based graph demonstrates one of the advantages of the LT model, e.g., preserving the information that characterizes and differentiates locations when projecting travelogue data into a low-dimensional topic space. Moreover, greatly reduced edge count is obtained by the LT model. As shown in FIG. 4, the LT model based graph produces about 330 edges, as compared to a corresponding TF-IDF based graph (not shown), which produces about 1256 edges. The edge count provides an indication of the number of computations performed. Thus, the edge count decrease of about 70% indicates that computational time is significantly reduced by the LT model.

The LT model leverages query expansion over local topics. Using the four location categories discussed above ((1) Beaches and Sun, (2) Casinos, (3) History and Culture, (4) Skiing) and the term "family," five queries were served as individual requests to the LT model to obtain a relevance-oriented recommendation. Table 3, below shows ranking results obtained by the LT model and a baseline method employing TF-IDF. The baseline method ranks locations for a query as a decreasing number of travelogues that contain both a location and a query term. Ground-truth represents a known true quantity for training.

The resulting location ranking lists of the two methods are evaluated by the number of locations, within the top K locations, matching the ground-truth locations. As shown by the experimental results in Table 3, the locations recommended via the LT model correspond with more of the ground-truth location categories than the baseline method. The difference is particularly evident for the requests "beach" and "casino."

TABLE 3

| | | | #Matches at top K | | | |
|---|---|---|---|---|---|---|
| Query | #Groundtruth | Method | K = 5 | K = 10 | K = 15 | K = 20 |
| beach | 35 | baseline | 1 | 4 | 7 | 9 |
| | | LT model | 4 | 9 | 12 | 13 |
| casino | 6 | baseline | 2 | 2 | 3 | 3 |
| | | LT model | 4 | 5 | 5 | 5 |
| family | 38 | baseline | 4 | 6 | 8 | 11 |
| | | LT model | 3 | 5 | 8 | 11 |
| history | 12 | baseline | 4 | 6 | 8 | 8 |
| | | LT model | 5 | 8 | 9 | 10 |
| skiing | 20 | baseline | 2 | 4 | 4 | 6 |
| | | LT model | 3 | 5 | 10 | 12 |

However, the baseline method corresponds with more of the ground-truth locations for the request "family" at the top 5 and top 10 results. This provides evidence that the LT model's method for measuring a location's relevance to a query term occurs in local topic space rather than in term space. The LT model expands the query with similar terms to enable partial matches and improve the relevance measurement for queries that are well captured by local topics (e.g., beach, casino). On the other hand, for query terms mainly captured by global topics (e.g., family, which is a top word of the global topic #22 shown in Table 2), the query expansion employed by the LT model is less effective due to a low confidence of that query term's distribution over local topics.

Table 4 lists some example destinations recommended by the LT model from the experimental results of Table 3. Correspondence between the results of the LT model and the ground-truth is demonstrated by the locations presented in italics.

TABLE 4

| Query | Top 10 recommended destinations |
| --- | --- |
| beach | Myrtle Beach, Maui, Miami, Santa Monica, Destin, Hilton Head Island, Virginia Beach, Daytona Beach, Key West, San Diego |
| casino | Las Vegas, Atlantic City, Lake Tahoe, Biloxi, Reno, Deadwood, New Orleans, Detroit, Tunica, New York City |
| family | Orlando, Las Vegas, New York City, Washington D.C., New Orleans, Charleston, Myrtle Beach, Chicago, San Francisco, Walt Disney World |
| history | New Orleans, Charleston, Williamsburg, Washington D.C., New York City, Chicago, Las Vegas, Philadelphia, San Francisco, San Antonio |
| skiing | Lake Tahoe, Park City, South Lake Tahoe, Jackson Hole, Vail, Breckenridge, Winter Park, Salt Lake City, Beaver Creek, Steamboat Springs |

Table 4 reveals a further strength of the tools and techniques for mining location-related aspects from travelogues. Specifically, while the destinations represented by the ground-truth are limited to cities, the LT model captures destinations based on attraction names (e.g., Walt Disney World) and regional names or nicknames (e.g., South Lake Tahoe).

Although single word queries were used for uniformity in the example illustrated in Table 3 and Table 4, the tools for mining location-related aspects from travelogues operate on multi-word requests as well. In various embodiments, a "location+context term" query may be automatically generated from extracted representative tags.

A "location+context term" query is an example of a multi-word request that may be received or generated.

Table 5 demonstrates examples of the top three snippets extracted using GSE based on three "location+context term" queries, 1) Alaska+wildlife, 2) Las Vegas+casino, and 3) Waikiki Beach+beach.

In Table 5, geo-snippet extraction and ranking produces useful travelogue snippets based on "location+context term" queries as demonstrated by the locations presented in bold and the context words relevant to the query term shown in italics in the extracted snippets. The snippets provide amalgamated viewpoints from several travelogues that are useful to those planning travel to the stated locations. Moreover, the snippets of Table 5 represent the top ranked three candidate snippets.

TABLE 5

| Query | Top three snippets |
| --- | --- |
| Alaska + wildlife | This time, the bus stopped at the Alaska Wildlife Conservation Center, where we saw musk oxen, bison, brownbears, black bears, eagles, owls, foxes, reindeers, and a few other animals. |
| | Along the way we stopped at the Alaska Wildlife Recreation Center to check on the musk ox, Moose, Brown and Black Bears, and many other Arctic animals. |
| | The rest of my week in Alaska was filled with more wildlife sightings, including numerous brownbears and cubs, caribou, and a rare black wolf in Denali; and a moose with a calf and several wild trumpeter swans. |
| Las Vegas + casino | With the ringing of slot machines it finally hit me, I was rolling into a Las Vegas casino! Sitting at the first row of slot machines we experienced one of the most amazing aspects of common casino etiquette. |
| | Being more inclined to stick my hard earned cash in a money market fund than a slot machine, Las Vegas and casinos have never held much allure for me, but I have to admit that the Las Vegas Strip with all the big casinos seemed pretty glamorous and exciting. |
| | We have played in the Casinos of Las Vegas! They want you to stay in the Casinos so they have waitresses coming around giving you free drinks and all you have to do is tip her $1 or $2 dollars and she just keeps coming back. |
| Waikiki Beach + beach | The famous Waikiki Beach is very beautiful and is packed with swimmers from the early hours, it has lovely clean sand but the beach is getting smaller by the year and is already at the base of a couple of hotels! The dreaded global warming! |
| | Since Waikiki Beach faces southwest, we were able to enjoy an extraordinary sunset right from the beach in front of our hotel, then we retired to our room where we spent the evening sitting out on the lanai, having some cocktails, and listening to the surf. |
| | If you are near the Waikiki Beach area, enjoy the day at thebeach, relax, and stay for the beautiful sunset. |

Given a query, (location $l_q$, keyword $w_q$), to recommend the most relevant and informative snippets, snippets are ranked in terms of their (1) geographic relevance to the location $l_q$, and/or (2) the semantic relevance of the keyword represented by $w_q$. Relevance scores are addressed in further detail below with regard to FIG. 12.

Example Operation

Probabilistic topic models are a type of dimension reduction approach useful in information retrieval (IR) that may be understood in terms of matrix factorization approaches. Although the computations of topic models are more complex than matrix factorization approaches, matrix factorization approaches may facilitate understanding of the probabilistic topic model. Additionally, matrix factorization approaches may be generalized to unseen data, e.g., query data. The "topic" of topic models is equivalent to the base vector in matrix factorization approaches. However, compared to matrix factorization approaches, topic models provide better insight to real world queries. Nevertheless, the analogousness of matrix factorizations and topic models enables better understanding of file decomposition implementation by various approaches and heuristics.

Existing probabilistic topic models, such as latent Dirichlet allocation (LDA), have been successfully applied to a variety of text mining tasks. The existing probabilistic models are not applicable in the vertical space of travelogues because the existing models do not address the limitations of travelogue data. Although documents under known probabilistic models are represented as mixtures of discovered latent topics, the entities appearing in the documents (e.g., locations mentioned in travelogues) either lack representation in the topic space, or are represented as mixtures of all topics, rather than the topics appropriate to characterize these entities. Considering the common topics in travelogues, the representation of locations using all topics would be contaminated by noise and thus unreliable for further relevance and similarity metrics.

As described above with reference to FIG. 1, knowledge mining operations 102 are performed to obtain location-representative knowledge 106 from user-generated travelogues 104. As discussed above, location extraction 102(A) decomposes travelogues 104 to extract locations and context word mining 102(B) mines context words from travelogues. Additionally, in some instances, travelogue modeling 102(c) trains a Location-Topic (LT) model on locations extracted from travelogues 104 to learn local and global topics, as well as to obtain representations of locations in the local topic space including geo-snippets 108.

Figure 5:
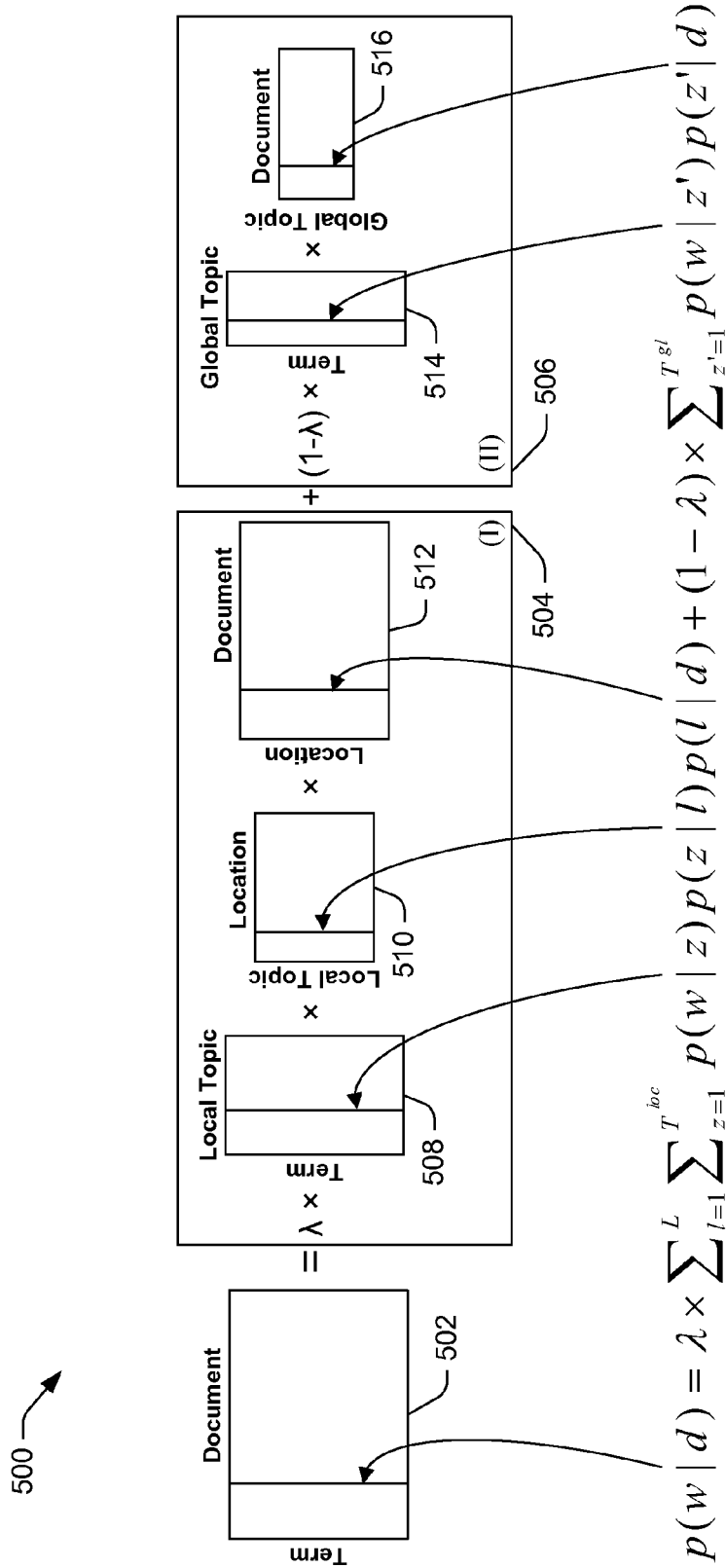
FIG. 5 is a matrix representation of an example of a decomposition model used to mine topic-related aspects from user-generated content comprising travelogues.

FIG. 5 illustrates a matrix representation of decomposition of user-generated content such as a travelogue. Such decomposition is completed as part of knowledge mining operations 102 in various implementations. By decomposing the file, location-representative knowledge is obtained from terms in the local topics. In at least one implementation terms from global topics are discarded; however the terms of the local topic and representing locations can be compactly represented and efficiently indexed.

Travelogues 104 are represented by a term-document matrix at 702, where the $j^{th}$ column encodes the $j^{th}$ document's distribution over terms. Based on this representation, a given term-document matrix 502 is decomposed into multiple matrices. A file, e.g., travelogue, is represented by local topics illustrated in the (I) box 504 and global topics illustrated in the (II) box 506. The matrices addressing local topics 504 include Term-LocalTopic matrix 508, LocalTopic-Location matrix 510, and Location-Document matrix 512. The matrices addressing global topics 506 include Term-Global-Topic matrix 514 and GlobalTopic-Document matrix 516.

The term-document matrix 502 is decomposed into Term-LocalTopic 508, Term-GlobalTopic matrix 514, matrix GlobalTopic-Document matrix 516, and Location-Document matrix 512. GlobalTopic-Document matrix 516 represents a common topic model, whereas Location-Document matrix 512 is specific to the LT model. A graphical illustration of the LT model is presented in FIG. 7, described below.

In at least one embodiment, travelogues 104 are represented by a term-document matrix 502 that is decomposed as represented by FIG. 5 in accordance with the following equation, Equation 1.

$$p(w|d) = \lambda \times \sum_{l=1}^{L} \sum_{z=1}^{T^{loc}} p(w|z)p(z|l)p(l|d) + \\ (1-\lambda) \times \sum_{z'=1}^{T^{gl}} p(w|z')p(z'|d) \quad \text{Equation (1)}$$

In Equation 1, p(w|d) indicates that each word w in document d has an associated probability p. Between 504 and 506, the distribution is binary—each word w in document d either contributes to local topics z, 504, or global topics z', 506. Local topic z has a probability of representing one or more locations l. When explicitly represented, a location l may be extracted from local topics z. Location l may also be learned from local topic z. The sum of extracted and learned locations l represent document d. Each location l has a probability of representing document d.

In some instances observed information such as existing location labels, (e.g., user-submitted tags, generated tags, etc.), associated with a travelogue may be employed to build the Location-Document matrix 512. However, due to such document-level labels typically being too coarse to cover all the described locations in travelogues, or even incorrectly marked, extracting locations from travelogue text may be preferred. There are several methods for location extraction, e.g., looking up a gazetteer, or applying a Web service like Yahoo Placemaker™. In several implementations an extractor based on a gazetteer and location disambiguation algorithms considering geographic hierarchy and textual context of locations are used to unambiguously identify location names even when the location names may also have common word meanings that are not location associated or when the location name may be associated with more than one location.

For example, a word or phrase may be identified as either a location name or a common word. Differentiating between location names and common words may be referred to as location detection. Location detection can use prior knowledge of the probability of a word being a location name or else being a common word that is not location associated. In some instances such probabilities may be collected from a corpus of many pieces of user-generated content, documents or articles.

As another example, a location name that may be associated with several geographic locations may be disambiguated to only the intended location instance. This disambiguation may be referred to as location recognition. Location recognition may predict the intended location instance of a location name using hints from other location names occurring within the same piece of user-generated content. In at least one implementation, results from location recognition may be used to validate results from location detection. For example, if several location names are found near a word W within a travelogue, it is more likely that the word W is a location name than a common word.

In some implementations, the operations of location detection and location recognition may be coupled with one another to extract or identify location names from textual content.

The extracted locations can provide an indication of locations described in a travelogue. However, such extracted locations are not sufficient to complete the Location-Document matrix 512 due to an observed gap between the extracted locations and the locations actually described in the travelogue. For instance, a series of locations may be mentioned in a trip summary, without any description or with minimal description in the text of the travelogue. The tools and techniques for mining location-related aspects from travelogues and geo-snippet extraction and ranking leverages how travelogue authors typically concentrate descriptions of some locations in consecutive sentences. That is, consecutive words tend to correspond to the same location. Considering these observations, all of the words in a segment (e.g., a document, paragraph, sentence, or sliding window) may be treated as sharing a multinomial distribution over locations, which is affected by a Dirichlet prior derived from the extracted locations in the segment. In this way, the Location-Document matrix 512 is kept variable to better model the data, while also benefiting from the extracted locations as priors.

As shown in FIG. 5, for the decomposition of probability p(w|d) in Equation 1, each word in a document is assumed to be "written" in either of the following two ways: (1) selecting a location, a local topic, and a term in sequence; (2) selecting a global topic and a term in sequence. A binary decision is made to select between (1) and (2) for each word. Once decomposed as above, the Location Topic (LT) model preserves a travelogue collection's location-representative knowledge in LocalTopic-Location matrix 510, and topics in Term-LocalTopic matrix 508 and Term-GlobalTopic matrix 514.

Figure 6:
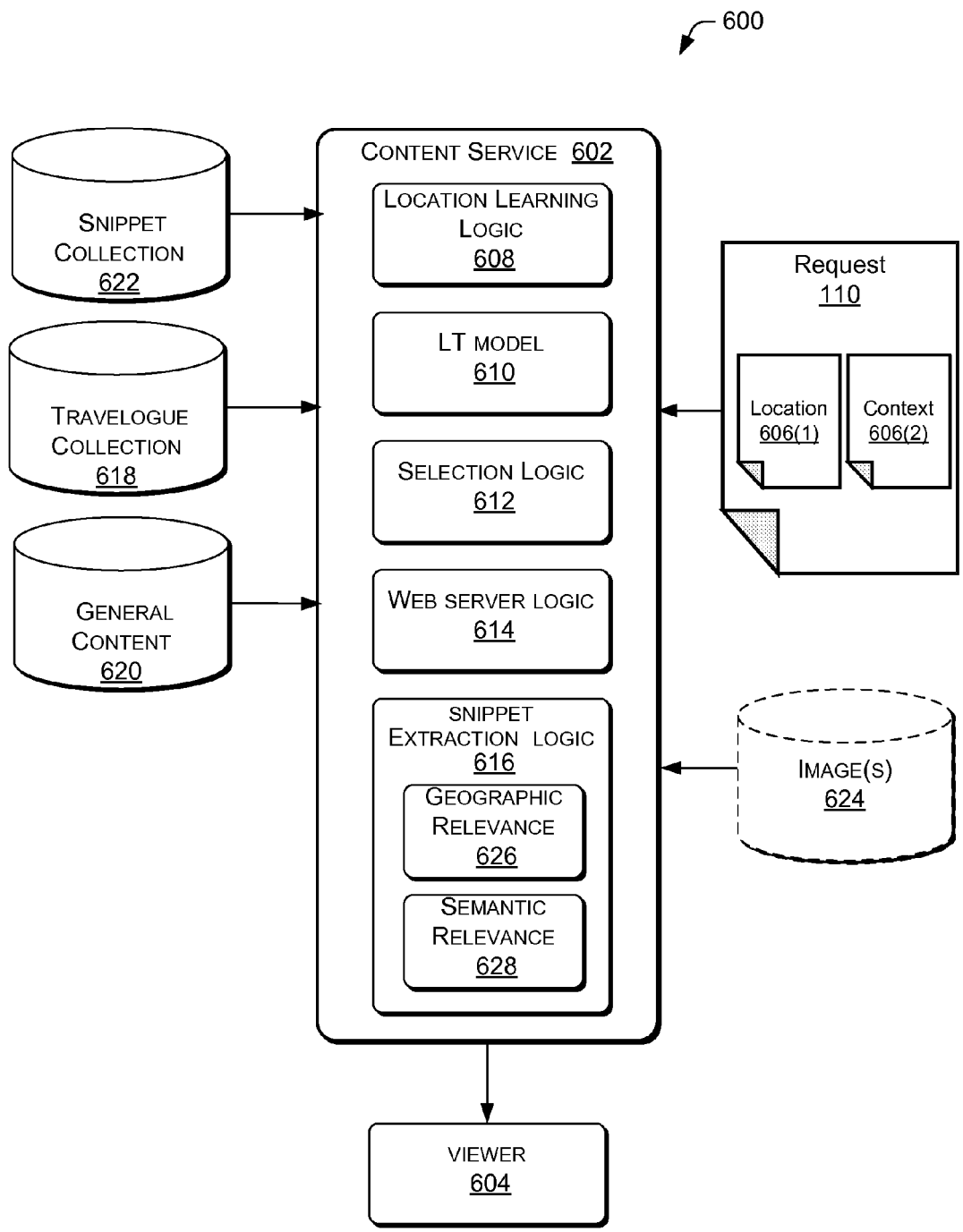
FIG. 6 is a system diagram showing illustrative logical relationships for SER.

FIG. 6 shows a system 600 that serves mined knowledge. Data is obtained by mining topic-related aspects from user-generated content such as travelogues, and may be provided to the user through various applications. Such a technique optimizes location related applications such as providing destination summaries and providing destination recommendation by automating analysis of user-generated content such as travelogues and blogs.

System 600 includes a content service 602 that provides search results through a viewer 604, oftentimes in response to a request 110. In some instances the request 110 is structured to include at least two terms 606, a location term 606(1) and a context term 606(2). In other instances the request 110 is unstructured and terms 606 are mined to obtain location term 606(1) and context term 606(2) from request 110. Content service 602 may be a network-based service such as an Internet site, also referred to as a website. The website and its servers might have access to other resources of the Internet and World-Wide-Web, such as various content and databases.

In at least one implementation, viewer 604 is an Internet browser that operates on a personal computer or other device having access to a network such as the Internet. Various browsers are available, such as Microsoft Corporation's Internet Explorer™. Internet or web content may also be viewed using other viewer technologies such as viewers used in various types of mobile devices, or using viewer components in different types of application programs and software-implemented devices.

In the described embodiment the various devices, servers, and resources operate in a networked environment in which they can communicate with each other. For example, the different components are connected for intercommunication using the Internet. However, various other private and public networks might be utilized for data communications between entities of system 600.

In system 600, content service 602, which is coupled to viewer 604, serves content responsive to a request 110. Content service 602 utilizes one or more of location learning logic 608, Location-Topic (LT) model 610, selection logic 612, web server logic 614, and snippet extraction logic 616 to obtain content from travelogue collection 618, general content 620 and snippet collection 622 In some instances system 600 includes images 624.

Location learning logic 608 decomposes a file, e.g., a travelogue or a blog into multiple components, one for local topics from which location-representative knowledge is obtained, and another for global topics that do not pertain to location and may be filtered out.

Location learning logic 608 represents functionality for decomposing files into local and global topics or components. Although the described embodiment discusses mining location-related aspects from travelogues, the techniques described herein are also useful for, among other things, determining search results for web pages, multimedia files, etc.

In various embodiments, the request 110 is used by location learning logic 608 and can represent a single request or a plurality of requests. Furthermore, request 110 may come from multiple sources. For example, a request 110 may come from a location mined from the Internet, user-generated content such as a document written by a user, and/or a web page visited by a user 624

The LT model 610 is shown as a component of content service 602. In various embodiments, the LT model 610 operates in concert with one or more of location learning logic 608, selection logic 612, web server logic 614, and snippet extraction logic 616. Alternately or additionally, LT model 610 may operate independent of the other components illustrated in content service 602.

LT model 610 facilitates discovering topics from travelogues and virtually simultaneously representing locations with appropriate topics. As discussed above, discovered topics include two types of topics, local topics which characterize locations from the perspective of travel (e.g., sunset, cruise, coastline), and global topics (e.g., hotel, airport) which do not particularly characterize locations but rather extensively co-occur with various locations in travelogues.

Based on the LT model 610, decomposing travelogues into local and global topics facilitates automatically obtaining location-representative knowledge from local topics, while other semantics captured by global topics are filtered out. The LT model 610 also enables representing a location as a mixture of local topics mined from a travelogue collection, which facilitates automatically summarizing multiple view-points of a location. Moreover, based on learned location representation in local topic space of the LT model 610, quantitative measurement of both the relevance of a location to a given travel idea and similarity between locations is possible.

For example, when request 110 is a request for a location, relevant results to be mined may be determined based on an intersection of the location itself using LT model 610. With requests for characteristics of locations, (e.g., beach, tropical, ocean, etc.), relevant results to be mined may be determined based on an intersection of the characteristics and associated locations using LT model 610.

Selection logic 612 selects content based on the determination of location learning logic 608 corresponding to request 110. In at least one embodiment, selection is made from travelogue collection 618.

Web server logic 614, in some instances, responds to various requests such as requests from viewer 604 and/or request 110 by providing appropriate content. In various embodiments, the request 110 is used by web server logic 614 rather than, or in addition to, location learning logic 608. Microsoft's IIS (Internet Information Services) is an example of widely used software that might be used in this example to implement web server logic 614. For example, web server logic 614 receives a request 110, and accesses various types of content, including general content 620, travelogue content from a travelogue collection 618, and snippets such as extracted geo-snippets 108 from a snippet collection 622624. Depending on the nature of the service implemented by content service 602, various combinations and types of content may be accessed, including text, graphics, pictures, video, audio, etc. The exact nature of the content is determined by the objectives of the service. In various implementations selection logic 612 operates with web server logic 614 to facilitate selection from snippet collection 622, travelogue collection 618, general content 620, or other sources of content. Such selection may be accomplished by searching for records referring to a location corresponding to the request, ranked based on the local topics or other location mining techniques as described herein.

In this context, a request 110 might comprise a location term 606(1) and/or a context term 606(2) and/or a characteristic of locations (not shown), and may, in some instances, be supplied by a user of content service 602. General content 620 might comprise documents, multimedia files and other types of content that are provided to viewer 604 via content service 602. For example, if content service 602 represents a search service, content service 602 may include various other features in addition to searching, such as discussion, chat, and news features.

Figure 8:
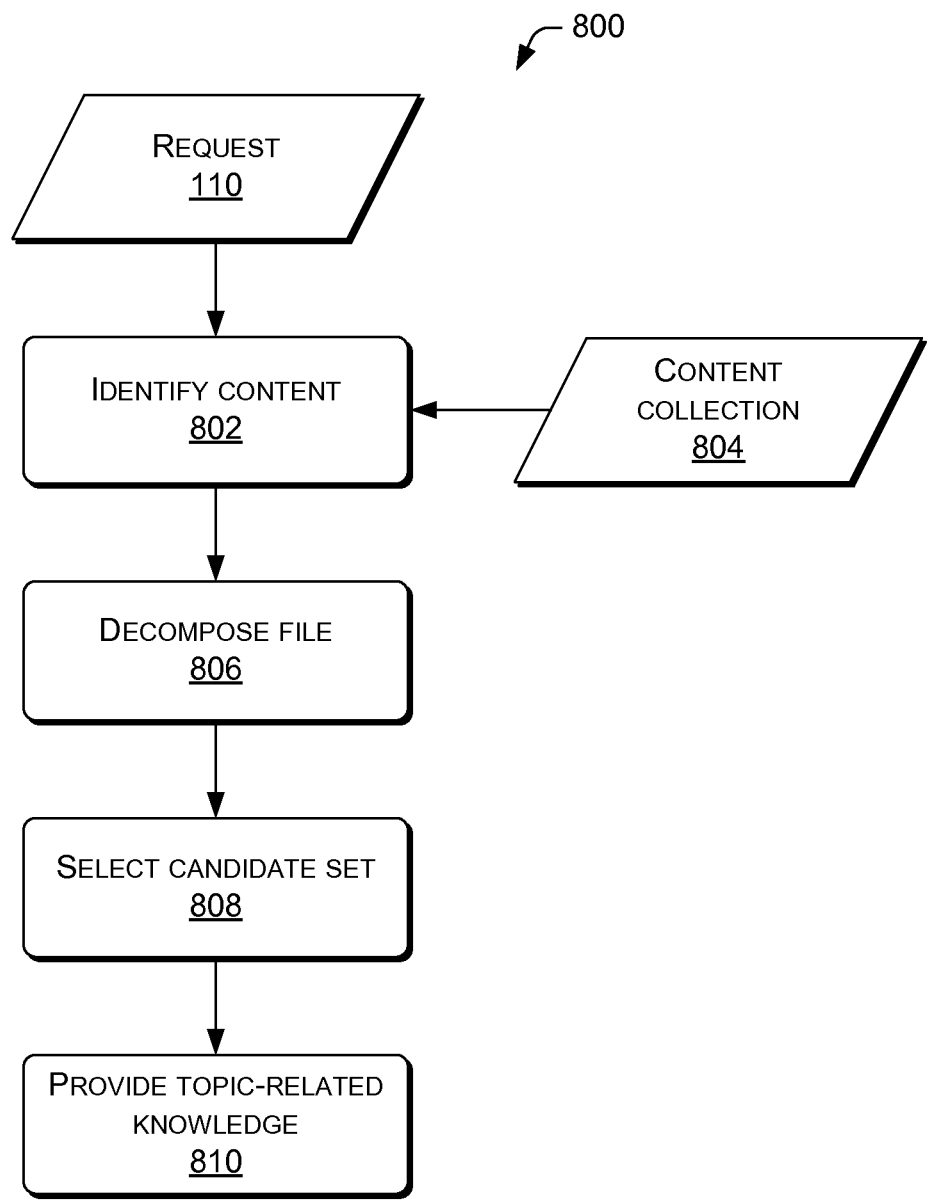
FIG. 8 is a flow diagram showing an illustrative process of geo-snippet extraction and ranking.

Content service 602 may generate a response to request 110 based on data retrieved from one or more third-party sources. FIG. 8 shows a collection of travelogue content 618 as an example of such sources. When serving content to viewer 604, content service 602 may retrieve one or more records from travelogues 104 which may be embodied as a candidate set or subset of travelogue collection 618, or in some instances a compound representation of travelogues 104 having undergone dimension reduction. In various embodiments a collection of snippets are included in travelogue content 618 and content service 602 employs snippet extraction logic 616 to extract snippets, such as geo-snippets 108, from one or more of a snippet collection 622, travelogue collection 618, and/or general content 620.

For example, responsive to location+context terms 606 in request 110, snippet extraction logic 616, sometimes in concert with the LT model 610 automatically identifies and extracts geo-snippets 108, which are relevant to the query 110. Geo-snippets 108 may be extracted from travelogues 104, a travelogue collection 618, or from snippet collection 622. Once a candidate snippet is identified responsive to request 110, snippet extraction logic 616 calculates geographic relevance 626 and semantic relevance 628 for the candidate snippet. Snippet extraction logic 616 ranks the candidate snippets relative to the request 110 based on a combination of geographic and semantic relevance scores.

Figure 7:
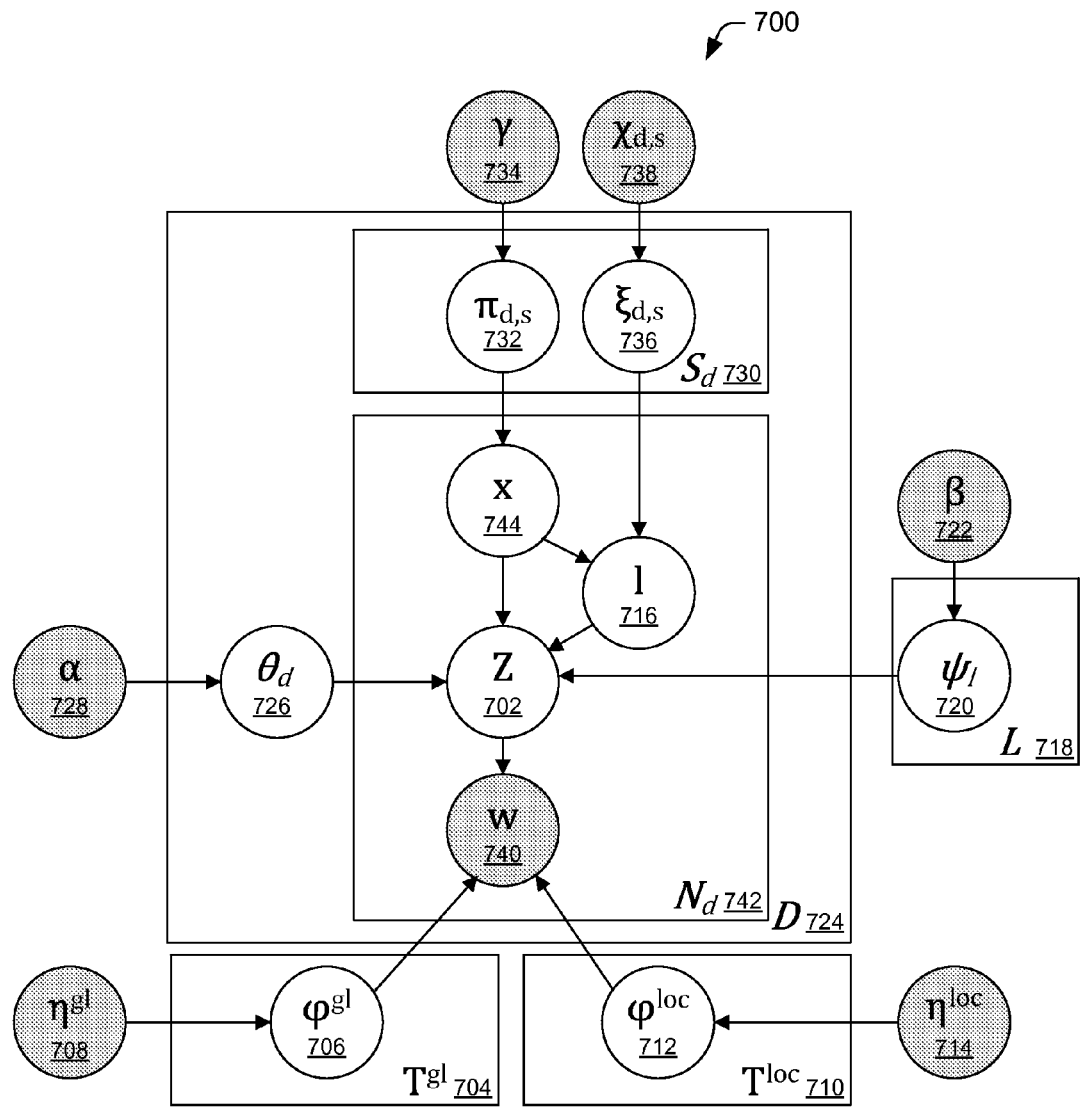
FIG. 7 illustrates an example probabilistic decomposition model (DM).

FIG. 7 presents a graphical representation of a mined topic probabilistic decomposition model 700, e.g., the Location-Topic (LT) probabilistic decomposition model introduced above with reference to 500 of FIG. 5 and implemented as Location-Topic model 610, shown in FIG. 6.

In the LT model 610, each location l is represented by $\psi_l$, a multinomial distribution over local topics, with symmetric Dirichlet prior $\beta$; while each document d is associated with a multinomial distribution over global topics, denoted by $\theta_d$, with symmetric Dirichlet prior $\alpha$.

To obtain a similarity-oriented recommendation in accordance with the similarity criterion, given a set of candidate destinations $\mathcal{L}$ and a query location $l_q$ (e.g., "Honolulu"), each destination $l \in \mathcal{L}$ is determined to have a similarity to $l_q$ in the local topic space. The similarity is defined as LocSim. Moreover, whatever the given query, every destination has an intrinsic popularity. Intrinsic popularity is approximated by how often a destination is described in travelogues. As the newest travelogues are collected from the Web, intrinsic popularity is kept updated to reflect travel trends.

A destination recommendation application may compute a rank score for recommendation as $Score_{l_q}(l) = \log LocSim(l_q, l) + \lambda \log Pop(l)$, $l \in \mathcal{L}$, $\lambda \geq 0$, where the coefficient $\lambda$ controls the influence of the intrinsic popularity Pop(l) in ranking. In at least one implementation, (l) is defined as the occurrence frequency of the location l in the whole travelogue corpus C, as $$(l) = \frac{\#(l \text{ appears in } C)}{\sum_{l' \in \mathcal{L}} \#(l' \text{ appears in } C)}.$$

To obtain a relevance-oriented recommendation in accordance with the intention criterion, given a travel intention described by a term $w_q$ (e.g., "hiking"), the destination recommendation application ranks destinations in terms of relevance to the query. Travel intention contains more semantics than a single term such as $w_q$. Thus, in various implementations, to provide a comprehensive representation to the travel ideal, the destination recommendation application expands $w_q$ in the local topic space as $\delta_{w_q}$ (a distribution over the local topics). In this way, the relevance of each location l to the query $w_q$ is automatically measured using Kullback-Leibler (KL)-divergence. The score for ranking is computed as $Score_{w_q}(l) = D_{KL}(\delta_{w_q} \| \psi_l) + \lambda \log Pop(l)$, $l \in \mathcal{L}$, $\lambda \geq 0$, where $\psi_l$ is location l's distribution over local topics. The above query expansion strategy supports more complex travel intentions, and enables operation on multiword or natural language queries in several implementations.

For a given location $l_q$, in knowledge mining operations 102 such as those discussed above with regard to FIG. 1, the LT model 610 ranks the terms $\{w=1:W\}$ with the probability $(w|l_q)$. Those terms with higher probabilities of serving as representative tags are selected for the location l. In at least one implementation, given a selected tag $w_q$, the LT model 610 generates corresponding snippets via ranking all the sentences $\{s\}$ in the travelogues 104 according to the query "$l_q+w_q$". For example, $\mathcal{L}_s$ is treated as the set of locations extracted from the sentence s and $W_s$ is treated as all the terms in s. From $\mathcal{L}_s$, s, and $W_s$ the sentence is ranked in terms of geographic relevance to a location $l_q$ as $Score_{l_q,w_q}(s) \times GeoRele_{l_q}(s) \times SemRele_{w_q}(s)$, where $GeoRele_{l_q}(s) = \#(l_q \text{ appears in } \mathcal{L}_s)/|\mathcal{L}_s|$. Correspondingly, the sentence is ranked in terms of semantic relevance to a tag $w_q$, $SemRele_{w_q}(s) = \Sigma_{w \in W_s} TermSim(w_q, w) \log(1+|Ws|)$. Using the above techniques each term in a sentence contributes to semantic relevance according to similarity $w_q$.

For example, given a travelogue d, which refers to a set of locations $\mathcal{L}_d$, the LT model 610 treats informative depictions of locations in $\mathcal{L}_d$ as highlights. Each term w in d has a possibility (l|w) to be assigned to a location l. In this way, the highlight of the location/may be represented with a W-dimensional term-vector $ul = u_{l,1}, \ldots, u_{l,W}$, where $u_{l,w} = \#$(w appears in d)×p(l|w), w=1, ..., W. Highlight $u_l$ is enriched with related images by collecting a set of images $R_l$ that are geographically relevant to the location l. Each image r∈$R_l$ is labeled with a set of tags, $T_r$. Based on the tags, each image r can also be represented as a W-dimensional vector $v_r = (v_{r,1}, \ldots, v_{r,W})$, where $v_{r,1} = \Sigma_{t \in T_r}$TermSim(t, w), w=1, ..., W.

A relevance score of r to $u_l$ is computed as $$Score_{ul}(r) = \langle u_l, v_r \rangle \cdot \frac{1}{\log(1 + |T_r|)},$$

r∈$R_l$, where $\langle \cdot, \cdot \rangle$ denotes an inner product, and $$\frac{1}{\log(1 + |T_r|)}$$

is used to normalize images with different numbers of tags. Moreover, to diversify the resulting images, images are selected one by one. Once the $k^{th}$ image $r_k$ is chosen, $u_l^{(k)}$ is iteratively updated to decay information already i expressed by the selected image, as $u_l^{(k)} = \{u_{l,w}^{(k-1)} \times \exp(-\tau \cdot v_{r_k,w})\}_{w=1}^{W}$, and $u_l^{(0)} = u_l$, where $\tau > 0$ is a penalty coefficient to control the decay strength.

In at least one implementation, location learning logic 608 treats document d using a bag-of-words approach, as a set of $S_d$ non-overlapping segments, (e.g., a document, paragraph, sentence, or sliding window). Each segment s is associated with (a) a bag-of-words, (b) a binomial distribution over global topics versus local topics, and (c) a multinomial distribution over a location set corresponding to segment s. The binomial distribution over global topics versus local topics $\pi_d$, has Beta prior $\gamma = \gamma^{gl}, \gamma^{loc}$. The multinomial distribution $\xi_d$, over segment s's corresponding location set $$\mathcal{L}_{d,s} \stackrel{def}{=} \{l \mid l$$

appears in segment s in d}, and has Dirichlet prior parameterized by $\chi_{d,s}$ defined as $$\chi_{d,s} \stackrel{def}{=} \{\delta_{d,s,l} = \mu \cdot \#(l$$

appears in segment s in d)$\}_{l \in \mathcal{L}_{d,s}}$, where "#(·)" is short for "the number of times" and coefficient μ denotes the precision of the prior. In at least one implementation, each paragraph in a travelogue is treated as a raw segment, with further merging to ensure that each segment contains at least one location.

In accordance with FIG. 7, a generative process of a travelogue collection C, which consists of D documents covering L unique locations and W unique terms, is defined graphically as follows.

At 702, when z represents a global topic, for each global topic z∈{1, ..., }, a multinomial distribution over terms, $\phi_z \sim \text{Dir}(\eta^{gl})$ is drawn, where $T^{gl}$ is represented at 704, $\phi^{gl}$ is represented at 706, and $\eta^{gl}$ is represented at 708. However, when z represents a local topic, for each local topic z∈{1, ..., $^{loc}$}, a multinomial distribution over terms, $\phi_z^{loc} \sim \text{Dir}(\eta^{loc})$ is drawn, where $T^{loc}$ is represented at 710, $\phi^{loc}$ is represented at 712, and $\eta^{loc}$ is represented at 714. $T^{gl}$ corresponds to matrix 514 and $T^{loc}$ corresponds to matrix 508 shown in FIG. 5.

At 716, l represents a location. For each location l∈{1, ..., L}, a multinomial distribution over local topics, $\psi_l \sim \text{Dir}(\beta)$ is drawn, where L is represented at 718, $\psi_l$ is represented at 720, and β is represented at 722. $\psi_l$ corresponds to matrix 510, shown in FIG. 5.

At 724, D represents an end document in a series. For each document d∈{1, ..., D}, a multinomial distribution over global topics, $\theta_d \sim \text{Dir}(\alpha)$ is drawn, where $\theta_d$ is represented at 726 and α is represented at 728. $\theta_d$ corresponds to matrix 516, shown in FIG. 5.

At 730, $S_d$ represents a segment of a document. For each segment s of document d, a binomial distribution over global topics versus local topics, $\pi_{d,s} \sim \text{Beta}(\gamma)$, is drawn, where $\pi_{d,s}$ is represented at 732 and γ is represented at 734. $\pi_{d,s}$ controls the ratio of local to global topics in a document. Additionally, for each segment s of document d, a multinomial distribution over locations in s, $\xi_{d,s} \sim \text{Dir}(\chi_{d,s})$, is drawn, where $\xi_{d,s}$ is represented at 736 and $\chi_{d,s}$ is represented at 738. $\xi_{d,s}$ controls which location is addressed by matrix 512 shown in FIG. 5.

At 740, w represents a word from a number of words N in a document d. For each word $w_{d,n}$ in segment s of document d, a binary switch, $x_{d,n} \sim \text{Binomial}(\pi_{d,s})$, is drawn, where $N_d$ is represented at 742, and x is represented at 744.

The LT model 610 uses switch variable x, 744, to control the assignment of words w, 740 as either a local topic $T^{loc}$ 710 or a global topic $T^{gl}$ 704.

Parameters of the LT model support a variety of applications by providing several data representations and metrics including a representation of a location, a location similarity metric, a term similarity metric, and inference.

Regarding location representation, a location l can be represented in either $T^{loc}$-dimensional local topic space or W-dimensional term space. For a $T^{loc}$-dimensional local topic space, location l is represented by $\psi_l$ namely its corresponding multinomial distribution over local topics. For a W-dimensional term space, a probability distribution over terms conditioned on location l is derived from raw Gibbs samples rather than the model parameters, by counting the words assigned to location l, as $p(w|l) \propto n_l^w$, w=1, ..., W where $n_l^w$ is the number of times term w is assigned to location l.

Regarding location similarity metrics, from the perspective of tourism, the symmetric similarity between two locations $l_1$ and $l_2$ is measured based on corresponding multinomial distributions over local topics $\psi_{l_1}$ and $\psi_{l_2}$ as $\text{LocSim}(l_1, l_2) = \exp\{-\tau D_{JS}(\psi_{l_1} \| \psi_{l_2})\}$, where $D_{JS}(\cdot\|\cdot)$ denotes a Jensen-Shannon (JS) divergence defined as $$D_{JS}(p \| q) = \frac{1}{2} D_{KL}\left(p \| \frac{p+q}{2}\right) + \frac{1}{2} D_{KL}\left(q \| \frac{p+q}{2}\right),$$

while $D_{KL}(\cdot\|\cdot)$ denotes the Kullback-Leibler (KL) divergence; coefficient τ>0 is used to normalize different numbers of local topics.

Regarding term representation, each term w in the vocabulary of the travelogue collection can be expanded to a probability distribution over the learned $T^{loc}$ local topics, denoted by $\delta_w$ shown by $\{\delta_w = \{p(z|w)\}_{z=1}^{T^{loc}}$, $p(z|w) \propto p(w|z)p(z) \propto \phi_{z,w}^{loc} \eta_z^{loc}$, where $\eta_z^{loc}$ is the total number of words assigned to local topic z.

Regarding term similarity metrics, from the perspective of tourism, the symmetric similarity between two terms $w_1$ and $w_2$ is measured based on corresponding probability distributions over local topics as $\text{TermSim}(w_1, w_2) = \exp\{(-\tau D_{JS}(\delta_{w_1} \| \delta_{w_2})\}$.

Regarding inference, given the learned parameters, hidden variables can be inferred for unseen travelogues. A Gibbs sampler is run on the unseen document d using updating formulas. In at least one embodiment the following updating formulas are used.

$$p(x_i = gl, z_i = z | w_i = w, x_{\setminus i}, z_{\setminus i}; \Omega)$$

$$\propto \varphi_{z,w}^{gl} \cdot \frac{n_{d,\setminus i}^{gl,z} + \alpha}{n_{d,\setminus i}^{gl} + T^{gl}\alpha} \cdot (n_{d,s,\setminus i}^{gl} + \gamma^{gl}), z = 1, \ldots, T^{gl}$$

$$p(x_i = loc, l_i = l, z_i = z | w_i = w, x_{\setminus i}, l_{\setminus i}; \Omega)$$

$$\propto \varphi_{z,w}^{loc} \cdot \psi_{l,z} \cdot \frac{n_{d,s,\setminus i}^{l} + \chi_{d,s,l}}{n_{d,s,\setminus i}^{loc} + \chi_{d,s}} \cdot (n_{d,s,\setminus i}^{loc} + \gamma^{loc}), z = 1, \ldots, T^{loc}$$

After collecting a number of samples, a distribution over locations for each term w appearing in document d can be inferred by counting the number of times w is assigned to each location l as $$p(l|w) = \frac{\#(w \text{ appears in } d \text{ and is assigned to } l)}{\#(w \text{ appears in } d)}.$$

Example Process

FIG. 8 shows an illustrative process 800 as performed by system 600 of FIG. 6 for automatically mining topic-related aspects from user-generated content, e.g., mining location-related aspects from travelogues and automatically performing snippet extraction and ranking (SER), e.g., geo-snippet extraction and ranking (GSER). This process is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, while this process is described with reference to the system 600 of FIG. 6, other architectures may implement this process in whole or in part.

At 802, content is identified from a content collection 804. For example, in response to request 110, one or more components of content service 602 accesses content such as general content 620, snippet collection 622, or travelogue collection 618. Similar to a travelogue collection 618, as mentioned above, content collection 804 includes user-generated content, although editorial content may also be included.

In various implementations content service 602 may be configured to receive a request 110 at various levels of granularity. For example, content service 602 may be configured to receive a single word or image as a destination query as well as various location descriptors as a request 110. In some instances, request 110 represents a "location+context term" query 606 that may be automatically generated using geo-snippet extraction and ranking as described herein.

At 806, location learning logic 608 decomposes a travelogue from content collection 804, for example as discussed above with regard to FIG. 2. Decomposition enables location learning logic 608 to learn locations and corresponding local topics as well as global topics from words in the travelogue by analyzing the content identified at 802. As discussed above, global topics are also filtered. Generally, the decomposition is accomplished by implementing a probabilistic topic model such as the Location-Topic (LT) model 610, discussed above, to discover topics from the travelogue and virtually simultaneously represent locations with appropriate corresponding topics of interest to tourists planning travel.

In several instances travelogues may be decomposed to location and context terms for processing by snippet extraction logic 616. In at least one implementation snippet extraction logic 616 extracts locations from local topics and mines the remaining local topic words for context terms to obtain geo-snippets 108.

At 808, selection logic 612, selects a candidate set corresponding to the locations identified in 806. For example, selection logic 612 extracts locations mentioned in the text of travelogues 104.

At 810, selection logic 612 provides the topic-related knowledge learned by the model, such as location-related knowledge, to support various application tasks.

Figure 9:
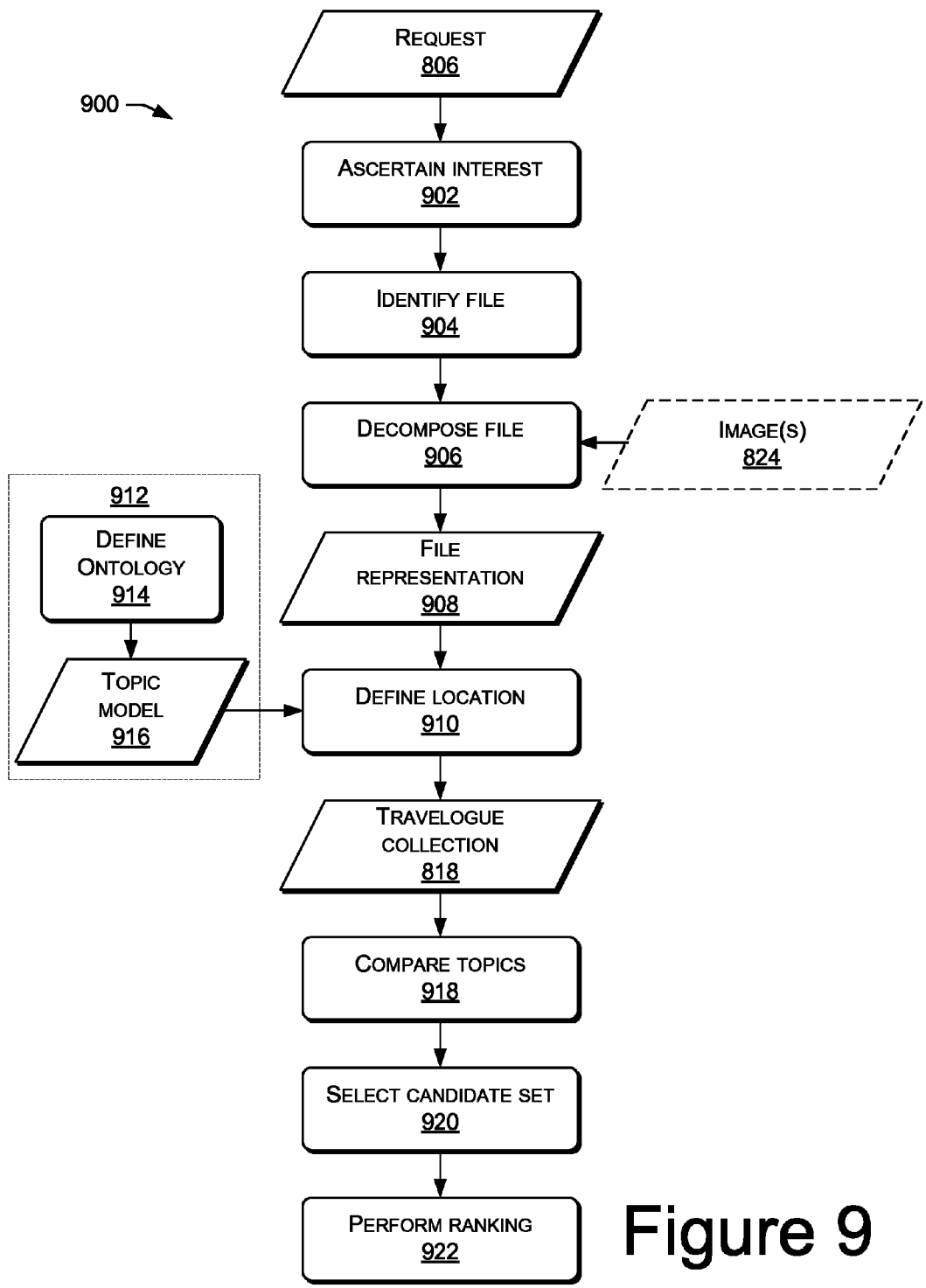
FIG. 9 is a flow diagram showing an illustrative process of GSER.

FIG. 9 shows another example process 900 for automatically mining location-related aspects including extracting geo-snippets from travelogues.

Blocks 902 through 910 and 918 through 922, shown in the vertical center of FIG. 9, are typically performed in response to a request 110 received at content service 602. In some instances request 110 may be automatically generated as a "location+context term" query such as by snippet extraction logic 616. In response to the request 110, travelogue results are selected and provided, for example through viewer 604.

At 902 a location or location related topic of interest is ascertained from request 110, for example via location learning logic 608.

At 904 a travelogue is identified for mining, for example by selection logic 612.

At 906 the selected travelogue is decomposed, for example with Location-Topic (LT) model 610. In various embodiments, this corresponds with decomposition 200 and/or 1006 discussed with regard to FIGS. 2 and 8, above. In at least one implementation, a decomposition model (DM), e.g. document decomposition model (DDM), image decomposition model (IDM), etc. decomposes the travelogue. The decomposition model described herein uses a flexible and widely applicable approach. The base function is to partition a file into local topics including locations and location characteristics, and global topics. In various implementations the global topics are abandoned, and the locations and location characteristics facilitate compact representation and efficient indexing. However, global topics need not be abandoned, and may be mined in some implementations, for example to obtain traveler commentary on particular hotels, airlines or rental car companies serving a location.

In some situations, images in, or associated with travelogues or travel locations are represented by a "bag of visual terms" (BOV), which allows text indexing techniques to be applied in large-scale image retrieval systems. However, an image query using BOV may approximate a long-query due to the large number of terms, e.g. 100, 1000, 1500 visual terms. Thus techniques for typical text queries (e.g. 2-10 terms) are inapplicable and using some text indexing techniques, e.g. inverted list, returns results that are misleading because the most distinguishing terms may be disregarded.

In some instances, a document-like representation of an image may serve as a file for decomposition by the decomposition model. Because the processing to obtain the BOV representation is optional, image(s) 624 is illustrated with a dashed line in FIG. 9. As mentioned above, decomposition of the travelogue at 906 includes identifying local topics and global topics that include background words. In several embodiments, while the local-topic-related words are projected onto a feature vector, the global-topic words, or a predetermined number of the global-topic words are retained, and any remaining or background words are discarded. In at least one embodiment, the local-topic-related words are projected onto a feature vector and each of the global-topic words is discarded.

The processing represented by block 906 may be performed, for example, by location learning logic 608. As described above with reference to FIG. 6, location learning logic 608 decomposes a travelogue (d) according to LT model 610 to discover topics from travelogues and represent locations with the learned topics. A travelogue document is treated as a mixture of topics, where each topic is a multinomial distribution over terms in the vocabulary and corresponds to some specific semantics. According to the described LT model 610, travelogues are composed of local and global topics, and each location is represented by a mixture of (more specifically, a multinomial distribution over) local topics. Thus, the LT model 610 automatically discovers local and global topics, as well as each location's distribution over local topics, from travelogue collection 618.

Decomposition of a travel related file at 906 results in a representation of the file, shown as file representation 908. File representation 908 provides an effective approximation of a travelogue from collection 618, except that representation 908 requires much less storage space than the raw file. Further, representation 908 provides for an efficient indexing solution.

At 910, the representation 908 is used as the basis of a textual search against topic model 916 to define a location.

In some instances the process shown in dashed block 912 is an offline process, performed prior to, or simultaneously with, the other actions shown in FIG. 9, to prepare reference data which will be used by the run-time process of dynamically selecting results shown on the portion of FIG. 9 that is outside of block 912. In other instances, the process shown in dashed block 912 is performed during the run-time process of dynamically selecting results shown in FIG. 9.

At 914, an ontology of local topics is defined in a vertical domain of certain types of documents, e.g., travelogues, for use by topic model 916. The vertical domain is defined with a hierarchical tree structure. A topic model 916 such as the LT model described herein comprises a hierarchical category tree, which is based on an open directory project (ODP) or concept hierarchy engine (CHE), or other available taxonomies. The hierarchical category tree is made up of category nodes. In the hierarchical structure, category nodes represent groupings of similar topics, which in turn can have corresponding sub-nodes or smaller groups of topics.

Topic model 916 is compiled offline, and used as a resource, for example by block 910. In other embodiments, the topic model 916 is determined dynamically, in conjunction with other processing shown in FIG. 9.

At 918, the defined location is compared or mapped to the collection of travelogue content 618. In several embodiments the collection of travelogue content 618 comprises representations of individual records of the collection of travelogue content 618, and at 918, location learning logic 608 compares one or more of the location and/or the local topics of the representations of the records of the collection of travelogue content 618 and request 110.

At 920, selection logic 612 selects a candidate set of results based on the comparison performed at 918.

At 922, selection logic 612 ranks the candidate set of search results selected at 920 based on the location and/or the associated local topics.

Figure 10:
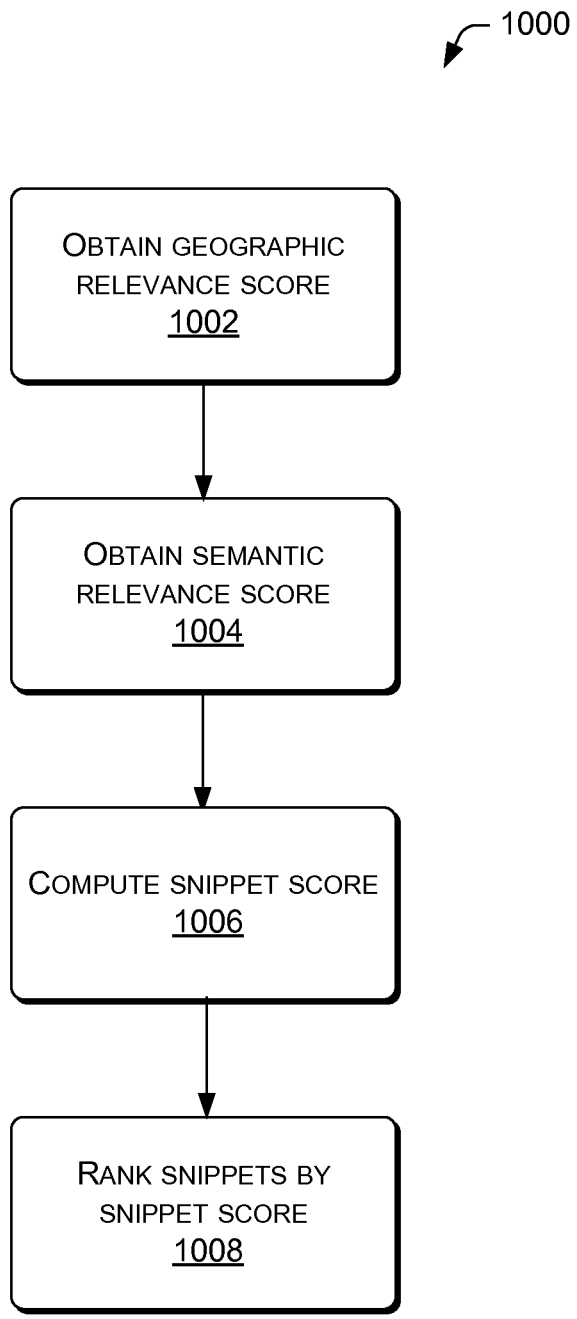
FIG. 10 is a flow diagram showing additional aspects of an illustrative process of GSER.

FIG. 10 at 1000 shows an example of an implementation of candidate snippet ranking.

At 1002 a geographic relevance score is obtained. In various embodiments the geographic relevance score is obtained by snippet extraction logic 616, although other elements of content service 602 such as location learning logic 608 may obtain the geographic relevance score. An example of how a geographic relevance score is calculated in at least one implementation of geo-snippet extraction and ranking is presented below.

A geographic relevance to location $l_q$ of a snippet s, which is represented by $\mathcal{L}_s$ $W_s$, $q_s$) is computed based on associated location set $\mathcal{L}_s$ as $$GeoRele_{l_q}(s) = \frac{\sum_{l \in \mathcal{L}_s} LocRele_{l_q}(l)}{|\mathcal{L}_s|} \in [0, 1],$$

where $$LocRele_{l_q}(l) = \begin{cases} 1 & l = l_q \\ \alpha \in [0, 1] & l \text{ is a child location of } l_q \\ 0 & \text{otherwise,} \end{cases}$$

and $|\mathcal{L}_s|$ denotes the number of elements in location set $\mathcal{L}_s$. This score can be interpreted as the proportion to which the locations mentioned in snippet s are relevant to location $l_q$.

Locations mentioned in a snippet are not always reliable to measure the geographic relevance of the snippet. When locations other than $l_q$ are mentioned in a snippet, which location the snippet is actually about, and/or a weight to be associated with each mentioned location, is determined. Moreover, for any snippet that only mentions the location $l_q$, the geographic score is fixed to be one, and thus cannot differentiate the snippet's actual relevance to $l_q$ from the other locations.

In consideration of the above issue, an associated word set $W_s$ of each snippet is incorporated into the measurement of geographic relevance, under the assumption that the more words representative to a location appear in a snippet, the more likely the snippet is relevant to that location. The representativeness of word w to location l is measured by the conditional probability of the word given the location as $$p(w \mid l) \propto \#(w \ co-occur \text{ with } l \text{ in a snippet}) \times$$

$$\log \frac{|\mathcal{L}|}{\sum_{l \in \mathcal{L}} \delta(w \ co-occur \text{ with } l \text{ in a snippet})}, w \in \mathcal{W},$$

(similar to TF-IDF) where #(observation) denotes the number of times of observation; δ(observation) denotes the existence of observation (i.e., 1 for true, and 0 for false); $\mathcal{L}$ is the universe set of unique locations mentioned in the snippet collection; W is the universe set of unique words appearing in the snippet collection. Based on this measurement, a modified geographic relevance score is obtained in various implementations. The modified geographic relevance score is defined as $$GeoRele_{l_q}(s) = weight_s(l_q) \times \frac{\sum_{l \in \mathcal{L}_s}[weight_s(l) \times LocRele_{l_q}(l)]}{\sum_{l \in \mathcal{L}_s} weight_s(l)},$$

where $weight_s(l) = \sum_{w \in W_s} p(w|l)$, and the first term denotes the absolute amount of information about $l_q$ contained in snippet s, while the second term serves as a penalty factor denoting the relative weight of $l_q$ among all locations mentioned in snippet s. In this way, snippets that exclusively mention location $l_q$ can have different geographic relevance scores, according to the occurrences of representative words to location $l_q$; while snippets mentioning more locations than $l_q$ will be further penalized, relying on not only the number of mentions of each location, but also the representativeness of words to each location.

At 1004, a semantic relevance score is obtained. In various embodiments the semantic relevance score is obtained by snippet extraction logic 616, although other elements of content service 602 such as location learning logic 608 may obtain the semantic relevance score.

An example of how a semantic relevance score is calculated in at least one implementation of GSER is presented below.

By measuring relevance of each unique word in a snippet to a query word $w_q$, based on their distance in semantic space, GSE enables leveraging the textual contexts of occurrences of query word $w_q$ to recommend snippets containing not only the exact query word and processed (e.g., stemmed) representations of the query word $w_q$, but also related and comprehensive information about the query word $w_q$.

In several implementations, a snippet collection C, such as from snippet collection 622, is projected into a T-dimensional latent topic space. In some embodiments snippet collection C may exist as a part of travelogue collection 618. In at least one implementation, a travelogue collection, such as that represented at 618, is projected into a T-dimensional latent topic space rather than a snippet collection. In the T-dimensional latent topic space, each dimension is a topic characterized by a probability distribution over W unique words in the collection.

T topics are denoted by index $z \in \{1, \ldots, T\}$. And W unique words are denoted by index $w \in \{1, \ldots, W\}$. The distribution of topic z over unique words is denoted by $\phi_z = \{(w|z)\}_{w=1:W}$. The distribution of collection C over topics is denoted by $\{p(z|C)\}_{z=1:T}$. In at least one implementation probabilistic latent semantic analysis (PLSA) is applied to learn topics $\{\phi_z\}_{z=1:T}$ and $\{p(z|C)\}_{z=1:T}$.

A unique word w is represented in the topic space by computing its distribution over topics as $\theta_w = \{p(z|w)\}_{z=1:T}$, $$w \in \{1, \ldots, W\}, \, p(z|C) + \varepsilon = \frac{p(w|z)p(z|w)}{\sum_{z=1}^{T} p(w|z')p(z'|C) + T\varepsilon},$$

$z \in \{1, \ldots, T\}$, $w \in \{1, \ldots, W\}$, where $\varepsilon > 0$ is used to smooth the resulting distribution $\theta_w$ to ensure that each component probability $p(z|w)$ is greater than zero.

Given the representation of words in the topic space, the word-level semantic relevance of a word w is defined to a given query word $w_q$ based on the Kullback-Leibler (KL) divergence from $\theta_{w_q}$ to $\theta_w$ as $WordSemRele_{w_q}(w) = \exp[-\tau \cdot D_{KL}(\theta_{w_q}\|\theta_w)] \in [0,1]$, where KL divergence $$D_{KL}(\theta_{w_q} \| \theta_w) = \sum_{z=1}^{T} p(z|w_q) \log \frac{p(z:w_q)}{p(z:w)}$$

and coefficient $\tau > 0$ controls the overall relevance of words other than the query word $w_q$. The semantic relevance of word $w_q$ to itself is always equal to one, independent of the semantic relevance to other words.

The semantic relevance of snippet s to query word $w_q$ is the sum of the word-level semantic relevance to $w_q$ of each word in the snippet's word set $w_s$ as represented by $SemRele_{w_q}(s) = \sum_{w \in W_s} WordSemRele_{w_q}(w)$.

In various implementations, either operation 1002 or 1004 may be replaced by other scoring models without departing from the disclosure of geo-snippet extraction described herein.

At 1006, in several implementations, an overall snippet score is computed based on the geographic relevance score obtained at 1002 and the semantic relevance score obtained at 1004. In at least one implementation the overall snippet score computed at 1006 represents all or part of location-representative knowledge 106, and/or location related knowledge to be provided at 810 of FIG. 8.

The overall score of a snippet s is computed as $core_{l_q,w_q}(s) = GeoRele_{l_q}(s) \times SemRele_{w_q}(s) \times q_s$. Individually, neither the geographic relevance nor the semantic relevance considers the effect of snippet length. Long snippets tend to have higher scores than short snippets. Hence, in the event that the quality score $q_s$ of snippet s does not handle the normalization of different snippet lengths, the above equation is further multiplied by a normalization factor, such as $$\frac{1}{|W_s|} \text{ or } \frac{1}{\log(1 + |W_s|)}.$$

At 1008, in several implementations, snippets are ranked based on snippet scores computed at 1006. In at least one implementation a configurable number of snippets, ranked in accordance with the score computed at 1006, represent geo-snippets 108. Moreover, ranking snippets represented at 1008 in accordance with the score computed at 1006 may make up all or part of the ranking performed at 922 in various implementations.

In various implementations all of the snippets in a candidate set are ranked in decreasing order of their overall scores, and the top snippets are recommended, such as to applications or end users.

Figure 11:
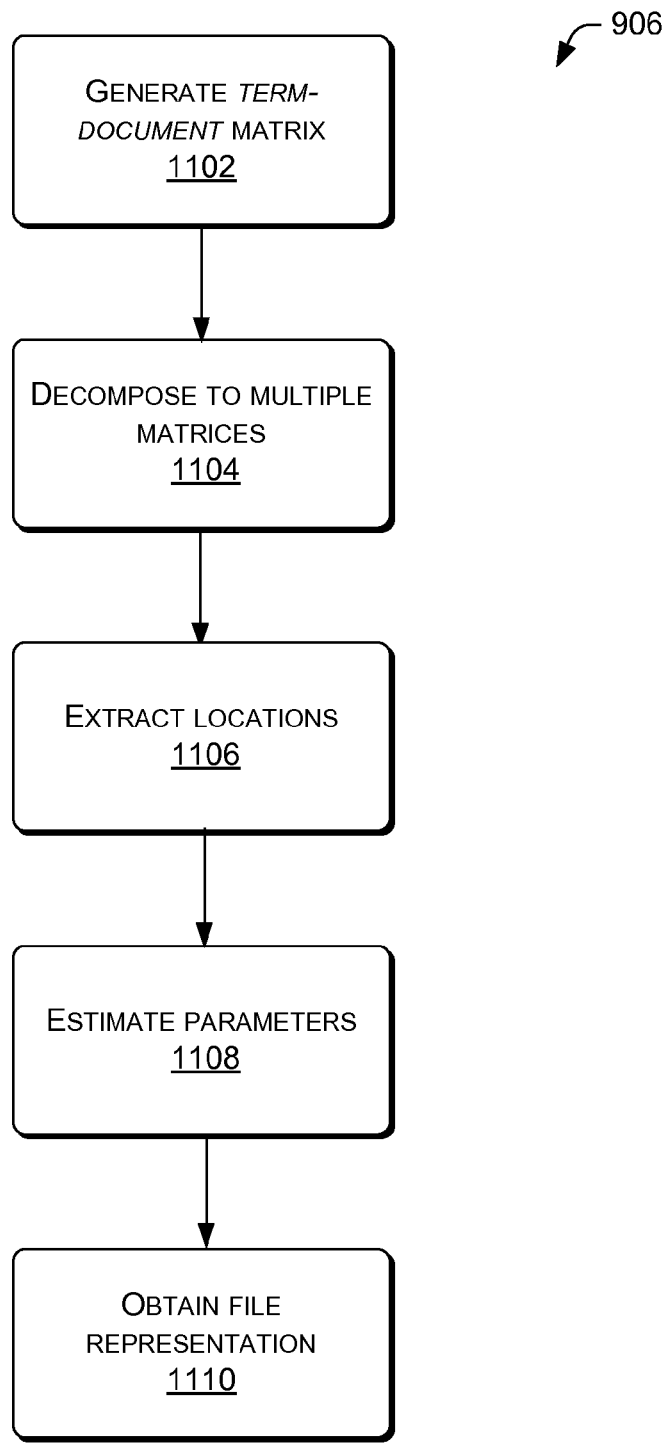
FIG. 11 is a flow diagram showing additional aspects of an illustrative process of GSER.

FIG. 11 shows an example process 906 to decompose a travelogue. Process 906 involves decomposing a file, e.g. a travelogue or a blog into local topics and global topics, which transforms the file to file representation 908 shown in FIG. 9.

At 1102 a term-document matrix is generated to represent a collection of travelogues 104, where the $j^{th}$ column encodes the $j^{th}$ document's distribution over terms, as illustrated at 502 of FIG. 5.

At 1104, based on this representation, the location learning logic 608 decomposes a given term-document matrix 502 into multiple matrices, including Term-LocalTopic matrix 508, Term-GlobalTopic matrix 514, LocalTopic-Location matrix 510, GlobalTopic-Document matrix 516 and Location-Document matrix 512 as discussed above.

At 1106 locations are extracted. In some instances observed information such as existing location labels, (e.g., user-submitted tags, automatically generated tags, etc.), associated with a travelogue may be employed to build the Location-Document matrix 512. However, due to such document-level labels typically being too coarse to cover all the described locations in travelogues, or even incorrectly marked, extracting locations from travelogue text may be advantageous. As described above, there are several methods for location extraction, e.g., looking up a gazetteer, or applying a Web service like Yahoo Placemaker™. In several implementations location learning logic 608 employs an extractor based on a gazetteer and location disambiguation algorithms considering geographic hierarchy and textual context of locations.

The extracted locations can provide an indication of locations described in a travelogue. However, such extracted locations are not sufficient to complete the Location-Document matrix 512 due to an observed gap between the extracted locations and the locations actually described in the travelogue. For instance, a series of locations may be mentioned in a trip summary, without any description or with minimal description in the text of the travelogue. The tools and techniques for mining location-related aspects from travelogues leverages how travelogue authors typically concentrate descriptions of some locations in consecutive sentences. Thus, consecutive words tend to correspond to the same locations. Considering these observations, location learning logic 608 treats all of the words in a segment (e.g., a document, paragraph, sentence, or sliding window) as sharing a multinomial distribution over locations, which is affected by a Dirichlet prior derived from the extracted locations in the segment. In this way, the Location-Document matrix 512 is kept variable to better model the data, while also benefiting from the extracted locations as priors.

At 1108 parameters including latent variables are estimated. The estimation is conditioned on observed variables: $p(x, l, z|w, \delta, \alpha, \beta, \gamma, \eta)$, where x, l, and z are vectors of assignments of global/local binary switches, locations, and topics terms in the travelogue collection 618.

In several implementations collapsed Gibbs sampling is employed for updating global topics and local topics during parameter estimation 1108. For example, location learning logic 608 employs collapsed Gibbs sampling with the following updating formulas.

For global topic $z \in \{1, \ldots, T^{gl}\}$, $p(x_i = gl, z_i = z | w_i = w, x_{\backslash i}, z_{\backslash i}, w_{\backslash i}, \alpha, \gamma, \eta^{gl})$ $\propto \cdot \frac{n_{w,\backslash i}^{gl,z} + \eta^{gl}}{\sum_{w'} n_{d,\backslash i}^{gl} + W\eta^{gl}} \cdot \frac{n_{d,\backslash i}^{gl,z} + \alpha}{n_{d,\backslash i}^{gl} + T^{gl}\alpha} \cdot (n_{d,s,\backslash i}^{gl} + \gamma^{gl})$, and for local topic $z \in \{1, \ldots, T^{loc}\}, l \in \mathcal{L}_{d,s}$ $p(x_i = loc, l_i = l, z_i = z | w_i = w, x_{\backslash i}, l_{\backslash i} z_{\backslash i}, w_{\backslash i}, \beta, \gamma, \eta^{loc})$ where $n_{w,\backslash i}^{gl,z}$ denotes the number of times term w is assigned to global topic z, and similarly $n_{w,\backslash i}^{loc,z}$ denotes the number of times term w is assigned to local topic z.

Regarding document d, $n_{d,\backslash i}^{gl}$ denotes the number of times a word in document d is assigned to global topic z, while $n_{d,\backslash i}^{gl}$ denotes the number of times a word in document d is assigned to a global topic. Regarding location l, $n_{l,\backslash i}^{loc,z}$ denotes the number of times a word assigned to location l is assigned to local topic z, out of $n_{l,\backslash i}$ words assigned to location l in total. Regarding segment s, $n_{d,s\backslash i}^{l}$ denotes the number of times a word in segment s of document d is assigned to location l, and consequently a local topic, while $n_{d,s\backslash i}^{gl}$ denotes the number of times a word in segment s of document d is assigned to a global topic, and $n_{d,s,\backslash i}^{loc}$ denotes the number of times a word in segment s of document d is assigned to a local topic. The subscript \i indicates that the $i^{th}$ word is excluded from computation.

After such a Gibbs sampler reaches burn-in, location learning logic 608 harvests several samples and counts the assignments to estimate the parameters:

$\phi_{z,w}^{x} \propto n_w^{x,z} + \eta^x, x \in \{gl, loc\}, z = 1, \ldots, T^x, \psi_{l,z} \propto n_l^{loc,z} + \beta,$
$z = 1, \ldots, T^{loc}$ At 1110, location learning logic 608 obtains a representation 908 of user-generated content, (e.g., travelogue, blog, etc.). The file is represented by local topics illustrated in the (I) box 504 of FIG. 5, and global topics illustrated in the (II) box 506 of FIG. 5.

Figure 12:
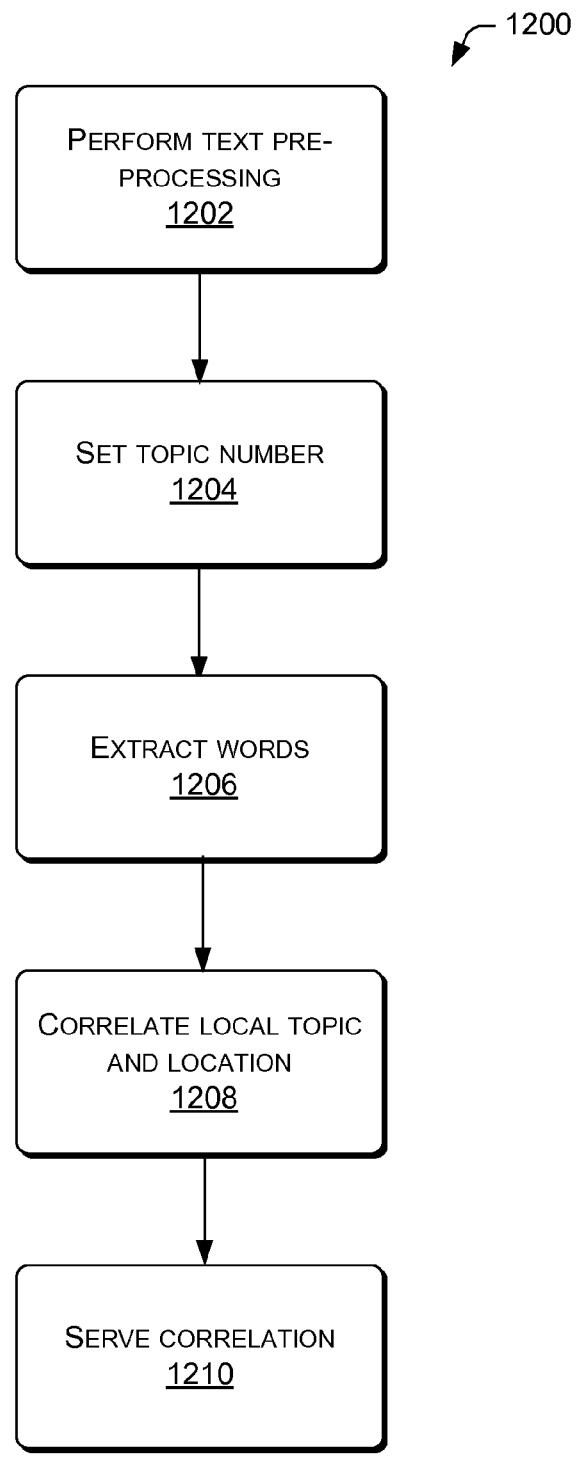
FIG. 12 is a flow diagram showing additional aspects of an illustrative process of GSER.

FIG. 12 illustrates a process 1200 of travelogue modeling to obtain topics and locations for comparison at 918 in at least one implementation. Process 1200 involves learning logic 608 processing a file, e.g. a travelogue or a blog to train an LT model to learn local topics and global topics.

At 1202, learning logic 608 performs text pre-processing including stemming and stop-word removal.

At 1204, a number of local and global topics are set. In several implementations an LT model 610 is trained on a variety of data sets to learn a configurable number of local topics and global topics. For example, the numbers of local and global topics may be set to a range corresponding to the size of the data set, e.g., about 0.10, 0.15, 0.20, etc, or empirically, e.g., 300, 200, 100, 50, etc.

At 1206, words within a threshold probability in a topic are extracted. In various implementations the threshold is configurable, for example based on the total number of words in a travelogue, a travelogue collection, or empirically, e.g., 5, 10, 20, etc.

At 1208, a correlation between a local topic z and a location/is measured by the conditional probability (z|l), which is equal to $\psi_l$, as discussed above.

At 1210, learned correlations are served for use in a variety of travel planning applications. In several implementations the correlations are stored for future use as part of travelogue collection 618 and maintained for use by a service such as content service 602.

As noted above, the order in which the processes have been described is not intended to be construed as a limitation, and any number of the described process blocks can be combined in any order to implement the processes, or alternate processes. Additionally, individual blocks or processes may be deleted without departing from the spirit and scope of the subject matter described herein. For example, in at least one embodiment, process 800 as discussed regarding FIG. 8, is performed independently of processes 900, 906, and 1200, as discussed regarding FIGS. 9, 11, and 12. However, in other embodiments, performance of one or more of the processes 800, 900, 906, and 1200 may be incorporated in, or performed in conjunction with each other. For example, process 906 may be performed in lieu of block 806 of FIG. 8.

Example Operating Environment

The environment described below constitutes but one example and is not intended to limit application of the system described above to any one particular operating environment.

Figure 13:
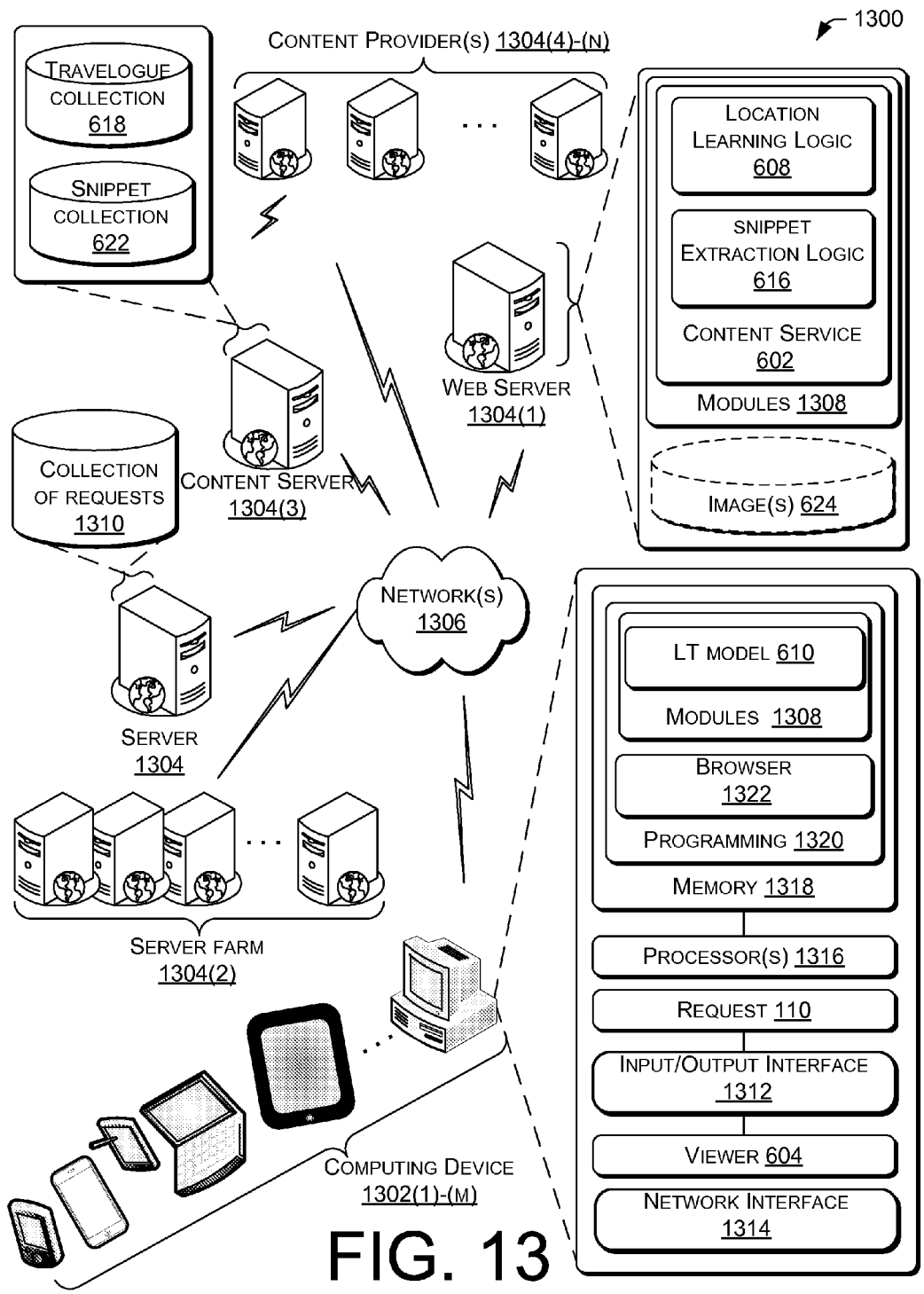
FIG. 13 is a pictorial representation of an illustrative operating environment.

Other environments may be used without departing from the spirit and scope of the claimed subject matter. The various types of processing described herein may be implemented in any number of environments including, but not limited to, stand along computing systems, network environments (e.g., local area networks or wide area networks), peer-to-peer network environments, etc. FIG. 13 illustrates a variety of devices and components that may be implemented in a variety of environments in which mining location-related aspects from user-generated content may be implemented.

FIG. 13 illustrates an example operating environment 1300 including one or more computing devices 1302 and one or more servers 1304 connected through one or more networks 1306. Computing devices 1302 may include, for example, computing devices 1302(1)-(M). Computing device 1302 may be one of a variety of computing devices, such as a desktop computer, a laptop computer, a smart phone, a multi-function mobile device, a personal digital assistant, a netbook computer, a tablet computer, or a server. Other examples of computing devices 1302 not shown in FIG. 13 may include, for example, a set-top box, a cellular telephone, and a laptop computer.

Servers 1304 include, for example, web server 1304(1), a server farm 1304(2), a content server 1304(3), and content provider(s) 1304(4)-(N). In various implementations, processing and modules discussed above with reference to FIGS. 6-12 may be implemented in any number of combinations across any number of the servers 1304 and computing devices 1302 shown in FIG. 13. For example, in various embodiments, results may be served by, or requested from, travelogue collection 618 housed on a content server 1304(3) or directly from content provider(s) 1304(4)-(N).

In the illustrated embodiment a web server 1304(1) may also host images and/or document-like representations of images 624, alternately called an image corpus, which content service 602 searches for graphically similar images. As illustrated, modules 1308 may be located at a server, such as web server 1304 and/or may be included in modules 1308 on any other computing device 1302. Similarly, a request 110, sometimes in the form of location+context terms 606, may be located at computing device 1302, sent over a network such as network(s) 1306 via streaming media, stored at a server 1304, or as part of a webpage such as at web server 1304(1) or server farm 1304(2).

In the example illustrated, content providers 1304(4)-(N) provide content that forms travelogue collection 618, which may then be accessed via networks 1306 through content server 1304(3) while another server 1304 maintains a collection of requests 1310.

Network 1306 may enable communication between a plurality of device(s) 1302 and/or server(s) 1304. Network 1306 can comprise a global or local wired or wireless network, such as the Internet, a local area network (LAN), or an intranet.

As illustrated, example computing device 1302 further includes at least one input/output interface 1312 and network interface 1314. Input/output interface 1312 enables computing device 1302 to receive input (e.g., request 110) and output results (e.g., through viewer 604). Network interface 1314 enables communication between computing device 1302 and servers 1304 over network(s) 1306. For example, request 110 may be communicated from computing device 1302, over network 1306, to web server 1304(1).

Example computing device 1302 includes one or more processor(s) 1316 and computer-readable storage media such as memory 1318. Depending on the configuration and type of device 1302, the memory 1318 can be implemented as, or may include, volatile memory (such as RAM), nonvolatile memory, removable memory, and/or non-removable memory, any may be implemented in any method or technology for storage of information, such as computer-readable instructions, data structures, program modules, or other data shown generally at 1308. Also, the processor(s) 1316 may include onboard memory in addition to or instead of the memory 1318. Some examples of storage media that may be included in memory 1318 and/or processor(s) 1316 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor(s) 1316. The computing device 1302 may also include input/output devices including a keyboard, mouse, microphone, printer, monitor, and speakers (not shown).

Various types of programming 1320 is embodied on the computer-readable storage media 1318 and is accessed and/or executed by processor(s) 1316. In at least one embodiment, the computer-readable storage media comprises, or has access to, a browser 1322, which is a module, program, or other entity capable of interacting with a network-enabled entity. Request 110 may be submitted to content service 602 via browser 1322 in at least one instance.

In various implementations modules 1308 contain computer-readable instructions for building an LT model 610 and for implementing content service 602 including location learning logic 608. Device 1302 represents computing hardware that can be used to implement functional aspects of the system shown in FIG. 6 at a single location or distributed over multiple locations. Network interface 1314 can connect device 1302 to a network 1306.

Device 1302 may serve in some instances as server 1304. In instances where device 1302 operates as a server, components of device 1302 may be implemented in whole or in part as a web server, in a server farm, as a search server, and as one or more provider(s) of content. Although discussed separately below, it is to be understood that device 1302 may represent such servers and providers of content.

Device 1302 also stores or has access to request 110. Although shown located at server 1304 in FIG. 13, such content may alternatively (or additionally) be located at device 1302, sent over a network via streaming media or as part of a service such as content service 602, or stored as part of a webpage, such as by a web server. Furthermore, in various embodiments request 110 may be located at least in part on external storage devices such as local network devices, thumb-drives, flash-drives, CDs, DVRs, external hard drives, etc. as well as network accessible locations.

In the context of the present subject matter, programming 1520 includes modules 1508, supplying the functionality for implementing tools and techniques for mining location-related aspects from travelogues and other aspects of FIG. 1 and FIG. 6. The modules 1308 can be implemented as computer-readable instructions, various data structures, and so forth via at least one processor 1316 to configure a device 1302 to execute instructions to implement content service 602 including location learning logic 608, LT model 610, selection logic 612, and/or snippet extraction logic 616 based on request 110. The computer-readable instructions may also configure device 1302 to perform operations implementing location learning logic 608 comparing request 110 with topics of travelogue collection 618 or snippet collection 622 to return results based on request 110. Functionality to perform these operations may be included in multiple devices or a single device as represented by device 1302.

Various logical components that enable mining location-related aspects from travelogues, geo-snippet extraction, travelogue collections 618, and snippet collections 622 may also connect to network 1306. Furthermore, request 110 may be sent locally from a computing device such as 1302 or from one or more network accessible locations, streamed, or served from a server 1304.

Aspects of computing devices, such as computing devices 1302 and 1304, in at least one embodiment include functionality for mining location-related aspects of travelogues using location learning logic 608 based on a collection or requests 1310 containing request 110.

CONCLUSION

Although mining topic-related aspects from user-generated content for snippet extraction and ranking (SER) has been described in language specific to structural features and/or methodological acts, it is to be understood that the techniques defined in the appended claims are not necessarily limited to the specific features or acts described. Rather, the specific features and acts are disclosed as illustrative forms of implementing the claims.

We claim:

1. A computer-readable storage medium having computer executable instructions encoded thereon, the computer executable instructions for execution by a processor to perform location-related mining operations on a travelogue, the operations comprising:
   receiving a query comprising a particular location and a context term which describes the particular location;
   identifying at least one snippet, the at least one snippet comprising a segment of user-generated content;
   filtering out one or more biased context terms from the at least one snippet, the one or more biased context terms describing a plurality of locations;
   extracting the particular location from the at least one snippet;
   mining the context term which describes the particular location from the at least one snippet;
   calculating a geographic relevance score for the at least one snippet based at least in part on the particular location;
   calculating a semantic relevance score for the at least one snippet based at least in part on the context term which describes the particular location;
   computing a snippet score based at least in part on the geographic relevance score and the semantic relevance score for the at least one snippet; and
   ranking the at least one snippet and at least one other snippet based at least in part on the snippet score of the at least one snippet.

2. A computer-readable storage medium as recited in claim 1, wherein the context term which describes the particular location comprises one of a style word or a keyword corresponding to a local topic.

3. A computer-readable storage medium as recited in claim 1, wherein the query is received in a form of location-representative knowledge from an automated knowledge mining operation.

4. A computer-readable storage medium as recited in claim 1, the operations further comprising:
   building a snippet collection from the at least one snippet and the at least one other snippet, wherein the at least one snippet and the at least one other snippet are assembled from one or more travelogues; and
   generating, in response to the query, representative tags for the particular location.

5. A computer-readable storage medium as recited in claim 4, wherein building the snippet collection from one or more travelogues comprises:
   identifying one or more particular locations mentioned in one or more travelogues;
   segmenting the one or more travelogues into one or more snippets, each snippet containing at least one identified particular location;
   determining whether a number of words of the one or more snippets meets a length constraint; and
   compiling the snippet collection from the one or more snippets that meet the length constraint.

6. A computer-readable storage medium as recited in claim 5, wherein the length constraint comprises one or both of a minimum number of words or a maximum number of words.

7. A computer-readable storage medium as recited in claim 1, the operations further comprising enriching the travelogue with one or more images based at least in part on matching the particular location and the context term which describes the particular location.

8. A computer-readable storage medium as recited in claim 1, wherein the at least one snippet is represented by at least one particular location, words within the at least one snippet other than locations, and a snippet quality score.

9. A computer-implemented method comprising:
   identifying a travelogue for location-related mining;
   decomposing the travelogue into a plurality of portions of the travelogue to identify a particular location and a context term, the context term characterizing the particular location without co-occurring with a plurality of locations;
   filtering out one or more noisy context terms that do not characterize the particular location and co-occur with a plurality of locations from at least one portion of the travelogue;
   extracting the particular location from the portion of the travelogue as decomposed;
   mining the context term which characterizes the location from the portion of the travelogue as decomposed;
   creating a geo-snippet comprising the particular location and the context term which characterizes the particular location;
   obtaining a geographic relevance score corresponding to the geo-snippet;
   obtaining a semantic relevance score corresponding to the geo-snippet; and
   computing, by a processor, a snippet score corresponding to the geo-snippet based at least in part on the geographic relevance score and the semantic relevance score.

10. A computer-implemented method as recited in claim 9, further comprising ranking a plurality of geo-snippets based at least in part on the snippet score.

11. A computer-implemented method as recited in claim 9, further comprising building at least one tag from information comprising one or both of the location or the context term which characterizes the location.

12. A computer-implemented method performed on one or more travelogues comprising:
   identifying at least one snippet from the one or more travelogues;
   filtering out one or more noisy context terms from the at least one snippet, the noisy context terms co-occurring with a plurality of locations;
   extracting a particular location from the at least one snippet;

mining a context term which characterizes the particular location from the at least one snippet;

calculating a geographic relevance score for the at least one snippet based at least in part on the particular location;

calculating a semantic relevance score for the at least one snippet based at least in part on the context term which characterizes the particular location;

computing a snippet score based at least in part on the geographic relevance score and the semantic relevance score for the at least one snippet;

ranking the at least one snippet based at least in part on the snippet score; and assembling the at least one snippet into a snippet collection.

13. A method as recited in claim 12, wherein the semantic relevance score is calculated based at least in part on a sum of distances in a topic space from a query word to a plurality of unique words contained in the at least one snippet.

14. A method as recited in claim 12, wherein computing the snippet score based at least in part on the geographic relevance score and the semantic relevance score for the at least one snippet includes determining a quality score based at least in part on snippet length.

15. A method as recited in claim 12, further comprising:
receiving the particular location and the context term which characterizes the particular location from a query; and returning the at least one snippet ranked based at least in part on the snippet score responsive to the query.

16. A method as recited in claim 12, further comprising, where there is a plurality of snippets, normalizing the snippet score with a normalization factor that accounts for different lengths between the plurality of snippets.

17. A computer-readable storage medium as recited in claim 1, wherein calculating the geographic relevance score is based at least in part on how often the particular location appears in the at least one snippet.

18. A computer-readable storage medium as recited in claim 1, wherein mining the context term is performed with a latent Dirichlet allocation.

19. A computer-readable storage medium as recited in claim 1, wherein the filtering out is based at least in part on comparing the context terms to a list of biased context terms.

20. A computer-readable storage medium as recite in claim 19, wherein the list of biased context terms comprises context terms that correspond to at least one of transportation, accommodation, or opinion.

* * * * *